United States Patent
Sato et al.

(10) Patent No.: US 8,830,491 B2
(45) Date of Patent: Sep. 9, 2014

(54) DOCUMENT PROCESSING APPARATUS, DOCUMENT PROCESSING METHOD, AND DOCUMENT PROCESSING PROGRAM

(75) Inventors: Junko Sato, Kawasaki (JP); Koji Nakagiri, Kawasaki (JP); Yasuo Mori, Yokohama (JP); Makoto Tomita, Kawasaki (JP); Wataru Kanaya, Chofu (JP); Michiko Kanaya, legal representative, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1835 days.

(21) Appl. No.: 11/107,961

(22) Filed: Apr. 18, 2005

(65) Prior Publication Data

US 2005/0243372 A1    Nov. 3, 2005

(30) Foreign Application Priority Data

Apr. 16, 2004   (JP) ................................. 2004-121872

(51) Int. Cl.
*G06F 15/00*   (2006.01)
*G06F 3/12*    (2006.01)
*G06F 17/21*   (2006.01)

(52) U.S. Cl.
CPC ............ *G06F 17/212* (2013.01); *G06F 3/1284* (2013.01); *G06F 3/1253* (2013.01); *G06F 3/1285* (2013.01); *G06F 3/125* (2013.01); *G06F 3/1205* (2013.01)
USPC .......... 358/1.13; 358/1.15; 358/1.18; 358/1.9

(58) Field of Classification Search
USPC ........ 358/518, 3.23, 530, 523–525, 1.13, 1.1, 358/1.14, 1.15, 1.9, 3.1, 3.2, 296, 401, 444; 399/38; 711/154; 347/262
See application file for complete search history.

(56) References Cited

U.S. PATENT DOCUMENTS

| 5,923,360 | A  | * | 7/1999  | Mori ............................. 347/262 |
| 6,002,849 | A  | * | 12/1999 | Koh et al. ..................... 358/1.18 |
| 6,643,415 | B1 | * | 11/2003 | Fukai et al. ................... 382/296 |
| 6,874,420 | B2 | * | 4/2005  | Lewis et al. ................... 101/485 |

(Continued)

FOREIGN PATENT DOCUMENTS

| JP | 4364977     | 12/1992 |
| JP | 2000259386 A | 9/2000 |

(Continued)

OTHER PUBLICATIONS

Japanese Office Action dated Jul. 21, 2009 in corresponding Japanese Application No. 2004-121872.

(Continued)

*Primary Examiner* — Allen H Nguyen
(74) *Attorney, Agent, or Firm* — Fitzpatrick, Cella, Harper & Scinto

(57) ABSTRACT

According to a document processing method for a document processing apparatus which lays out page data that form a document by a plurality of pages on one print medium, and sets the print form of the document, set attribute information is acquired as the print form of the document. When cut edge position designation for cutting, after printing, the print medium on which pages are laid out has been set in the acquired attribute information, layout control is executed in which the head/tail orientation of the second page corresponding to the latter half of the document is reversely rotated with respect to the first page corresponding to the former half of the document and the second page is imposed on the print medium.

9 Claims, 45 Drawing Sheets

(56) References Cited

U.S. PATENT DOCUMENTS

| | | | |
|---|---|---|---|
| 7,203,900 B2 * | 4/2007 | Nara et al. | 715/255 |
| 2002/0052897 A1 * | 5/2002 | Nishikawa et al. | 707/527 |
| 2003/0020956 A1 * | 1/2003 | Goel et al. | 358/1.18 |
| 2004/0111675 A1 | 6/2004 | Mori et al. | 715/513 |
| 2004/0139389 A1 | 7/2004 | Sato et al. | 715/500.1 |
| 2004/0174552 A1 * | 9/2004 | Miyake et al. | 358/1.12 |
| 2005/0094206 A1 | 5/2005 | Tonisson | 358/1.18 |

FOREIGN PATENT DOCUMENTS

| | | |
|---|---|---|
| JP | 2001205885 A | 7/2001 |
| JP | 2002185760 A | 6/2002 |
| JP | 2002281278 A | 9/2002 |
| JP | 2004023342 A | 1/2004 |
| JP | 2005020587 A | 1/2005 |
| JP | 2005081788 A | 3/2005 |
| JP | 2005267085 A | 9/2005 |
| JP | 9123562 A | 5/2007 |

OTHER PUBLICATIONS

Japanese Office Action dated Jan. 25, 2010 in corresponding Japanese Application No. 2004-121872.

* cited by examiner

FIG. 4A

| NO | ATTRIBUTE INFORMATION | | REMARKS |
|---|---|---|---|
| 1 | PRINTING METHOD | SINGLE-SIDED/ DOUBLE-SIDED/ BOOKBINDING PRINTING | |
| 2 | PAPER SIZE | DOCUMENT SIZE/ FIXED SIZE | · Z-FOLD IS DESIGNATED WHEN "A4+A3", "B4+B3", OR "LETTER+LEDGER (11x17)" IS DESIGNATED.<br>· DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | · SELECTABLE ONLY FOR FIXED SIZE |
| 4 | BINDING MARGIN/ BINDING DIRECTION | | · SHIFT/ENLARGEMENT & REDUCTION CAN BE DESIGNATED. |
| 5 | N-up PRINTING | NUMBER OF PAGES/LAYOUT ORDER/BORDER LINE/LAYOUT POSITION, ETC.RRANGEMENT POSITION etc. | · LAYOUT POSITION: NINE PATTERNS<br>· TOTAL NUMBER OF PAGES OF DOCUMENT<br>· X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | · WATERMARK CAN BE DESIGNATED INDIVIDUALLY IN LOGICAL OR PHYSICAL PAGES.<br>· ALL CHAPTERS/PAGES ARE TARGETED. |

FIG. 4B

| | | |
|---|---|---|
| 8 | HEADER/FOOTER | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ENLARGEMENT & REDUCTION DESIGNATION/ BINDING MARGIN/FASCICLE DESIGNATION, ETC. | • ONLY IN BOOKBINDING PRINTING |
| 11 | FRONT/BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX PAPER | | • PRINTING OF CHARACTER STRING ON INDEX PORTION OR ANNOTATION ON INDEX PAPER CAN BE SET.<br>• BOOKBINDING PRINTING CANNOT BE DESIGNATED. |
| 13 | INSERTING PAPER | | • FEED PORT (INCLUDING INSERTER) IS DESIGNATED.<br>• DOCUMENT DATA CAN BE PRINTED ON INSERTED PAPER.<br>• BOOKBINDING PRINTING CANNOT BE DESIGNATED. |
| 14 | CHAPTER SEGMENTATION | "NONE"/"PAGE BREAK"/ "PAPER CHANGE" | • "PAPER CHANGE" IS FIXED WHEN INDEX PAPER OR INSERTING PAPER IS DESIGNATED.<br>• "PAPER CHANGE" IN SINGLE-SIDED PRINTING |
| 15 | PAGE REPEAT PRINTING | 2-TIME PAGE REPEAT PRINTING/4-TIME PAGE REPEAT PRINTING/FORMER/ LATTER COMBINED PRINTING | • 2-TIME PAGE REPEAT PRINTING/4-TIME PAGE REPEAT PRINTING/ FORMER/LATTER COMBINED PRINTING<br>• MIXED PAPER AND THE LIKE CAN BE DESIGNATED.<br>• ALIGNMENT OF CUT EDGES |

FIG. 5

| NO | ATTRIBUTE INFORMATION | | REMARKS |
|---|---|---|---|
| 1 | PAPER SIZE | DOCUMENT SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/BORDER LINE/ LAYOUT POSITION, ETC. | • LAYOUT POSITION: NINE PATTERNS<br>• TOTAL NUMBER OF PAGES OF CHAPTER X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|---|---|---|---|
| 1 | PAGE ROTATION DESIGNATION | | · 0°/90°/180°/270° CAN BE DESIGNATED. |
| 2 | WATERMARK | DISPLAY/NON-DISPLAY | · WHETHER TO DISPLAY ALL WATERMARKS DESIGNATED BY BOOK IS DESIGNATED. |
| 3 | HEADER/FOOTER | DISPLAY/NON-DISPLAY | · WHETHER TO DISPLAY ALL HEADERS/FOOTERS DESIGNATED BY BOOK IS DESIGNATED. |
| 4 | ZOOM | 50% –200% | · MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

BOOK | ? | X

| PAGE SETUP | DECORATION | EDIT | PAPER SOURCE |

PAPER SIZE : [MATCH PAGE SIZE ▼]

☑ ZOOM FOR PAPER — 1401

ORIENTATION : [A] ● PORTRAIT   [A] ○ LANDSCAPE

PAGE LAYOUT : [1 PAGE PAR SHEET ▼]

ORDER : [NONE ▼]

BORDER LINE : [NONE ▼]

☐ ZOOM FOR AREA — 1402

ZOOM ARRANGE : [☐ CANTER ▼]

[OK]   [CANCEL]   [APPLY]

[DEFAULT]

[HELP]

FIG. 15

| CHAPTER | | | |
|---|---|---|---|
| PAGE SETUP | FINISHING | EDIT | PAPER SOURCE |

☑ FOLLOW BOOK ATTRIBUTE ~1501

PAPER SIZE: [ MATCH PAGE SIZE ▼ ]

☑ ZOOM FOR PAPER

ORIENTATION: [A] ● PORTRAIT   [A] ○ LANDSCAPE

☑ FOLLOW BOOK ATTRIBUTE ~1502

PAGE LAYOUT: [ 1 PAGE PAR SHEET ▼ ]

ORDER: [ NONE ▼ ]

BORDER LINE: [ NONE ▼ ]

☑ FOLLOW BOOK ATTRIBUTE ~1503

☐ ZOOM FOR AREA

ZOOM ARRANGE: [ CANTER ▼ ]

[ DEFAULT ]

[ OK ]  [ CANCEL ]  [ APPLY ]  [ HELP ]

CHAPTER

| PAGE SETUP | FINISHING | EDIT | PAPER SOURCE |

☐ FOLLOW BOOK ATTRIBUTE ~1501

PAPER SIZE : [ A4 ▼ ]

☑ ZOOM FOR PAPER

ORIENTATION : [A] ● PORTRAIT  [A] ○ LANDSCAPE

☐ FOLLOW BOOK ATTRIBUTE ~1502

PAGE LAYOUT : [▦ 4 PAGE PAR SHEET ▼]

ORDER : [▦ ACROSS FROM UPPERLEFT ▼]

BORDER LINE : [ NONE ▼ ]

☑ FOLLOW BOOK ATTRIBUTE ~1503

☐ ZOOM FOR AREA

ZOOM ARRANGE : [ ☐ CANTER ▼ ]

[ OK ] [ CANCEL ] [ APPLY ] [ DEFAULT ] [ HELP ]

| PAGE | | |
|---|---|---|
| PAGE SETUP | EDIT | |

PAGE LOTATION: [R] 0 DEGREE ▼

☑ FOLLOW CHAPTER ATTRIBUTE — 1701

☐ NO ZOOM

☐ FREE ZOOM : 100 ◄▶  % (50 to 200)

ZOOM ARRANGE : ☐ CANTER ▶  SET POSITION...

[OK] [CANCEL] [APPLY] [DEFAULT] [HELP]

F I G. 20B
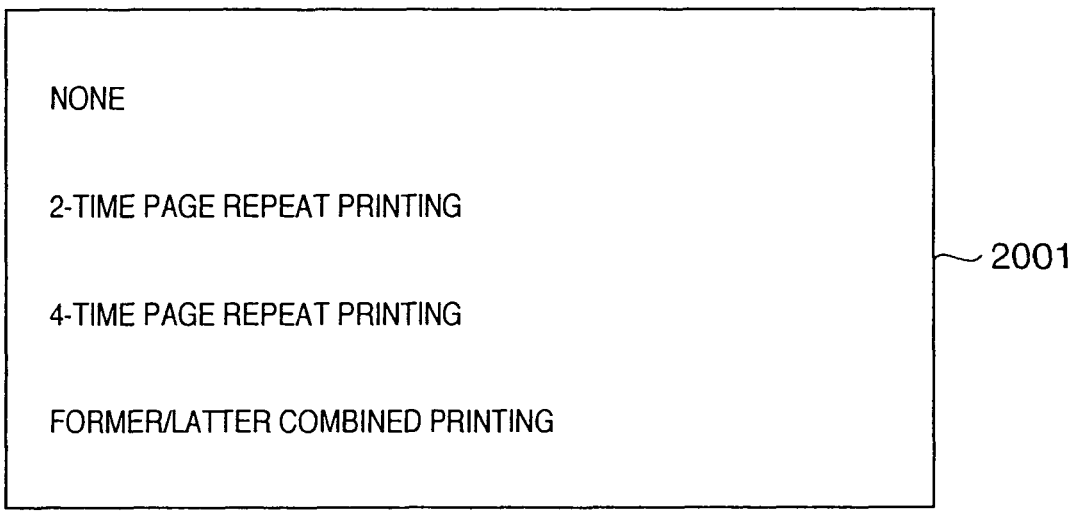

F I G. 21

2100

DETAILED SETTING FOR DOCUMENT

| PAGE SETUP | FINISHING | EDIT | PAPER FEED | PRINT QUALITY |

OUTPUT PAPER SIZE(S): [A4 (A5 DOCUMENT X 2) ▼] ~2101

☑ ENLARGE/REDUCE DOCUMENT IN ACCORDANCE WITH OUTPUT PAPER SIZE(E)

ORIENTATION OF OUTPUT PAPER(T): [A] ● PORTRAIT  [A] ○ LANDSCAPE
2102

PAGE LAYOUT(L): [1 PAGE PER SHEET (STANDARD) ▼]

ORDER(O): [NONE ▼]

BORDER LINE(B): [NONE ▼]

☐ ENLARGE/REDUCE DOCUMENT IN ACCORDANCE WITH MARGIN(F)

ARRANGE DOCUMENT(G): [☐ CANTER ▼]

MARGIN/HEADER/HOOTER POSITION(M)...   RESTORE TO LATEST SAVE STATE(V)

[ OK ]   [ CANCEL ]   [ APPLY(A) ]   [ HELP(H) ]

FIG. 22

| A4 (A5 DOCUMENT X 2) | ▲ |
|---|---|

| A4 | ▲ |
|---|---|
| A5 | |
| B4 | |
| B5 | |
| SIDE-OPENING ENVELOPE NO. 2 | |
| POSTCARD | |
| FOUR POSTAL CARDS | |
| SIDE-OPENING ENVELOPE NO. 4 | |
| A4 & A3 | |
| B5(JIS) & B4(JIS) | ▼ |

PAGE REPEAT PRINTING
(4-TIME PAGE REPEAT PRINTING LANDSCAPE)

PAGE REPEAT PRINTING
(2-TIME PAGE REPEAT PRINTING LANDSCAPE)

PAGE REPEAT PRINTING
(4-TIME PAGE REPEAT PRINTING PORTRAIT)

PAGE REPEAT PRINTING
(2-TIME PAGE REPEAT PRINTING PORTRAIT)

FIG. 26

| PAPER | LEFT SIDE | RIGHT SIDE | REMARKS |
|---|---|---|---|
| FIRST PAPER SHEET | FIRST PHYSICAL PAGE | ([N/2]+1)TH PHYSICAL PAGE | |
| SECOND PAPER SHEET | SECOND PHYSICAL PAGE | ([N/2]+2)TH PHYSICAL PAGE | |
| FINAL PAPER SHEET | [N/2]TH PHYSICAL PAGE | NTH PHYSICAL PAGE | N = EVEN NUMBER |
| FINAL PAPER SHEET | [N/2]TH PHYSICAL PAGE | NONE | N = ODD NUMBER |

FIG. 27

| PAPER | | UPPER/LOWER SURFACE | LEFT SIDE | RIGHT SIDE | REMARKS |
|---|---|---|---|---|---|
| FIRST PAPER SHEET | | UPPER SURFACE | FIRST PHYSICAL PAGE | $([N/2]+1)$TH PHYSICAL PAGE | |
| | | LOWER SURFACE | SECOND PHYSICAL PAGE | $([N/2]+2)$TH PHYSICAL PAGE | |
| SECOND PAPER SHEET | | UPPER SURFACE | THIRD PHYSICAL PAGE | $([N/2]+3)$TH PHYSICAL PAGE | |
| | | LOWER SURFACE | FOURTH PHYSICAL PAGE | $([N/2]+4)$TH PHYSICAL PAGE | |
| | | | | | |
| FINAL PAPER SHEET | | UPPER SURFACE | $([N/2]-1)$TH PHYSICAL PAGE | $(N-1)$TH PHYSICAL PAGE | N = EVEN NUMBER |
| | | LOWER SURFACE | $[N/2]$TH PHYSICAL PAGE | NTH PHYSICAL PAGE | |
| FINAL PAPER SHEET | | UPPER SURFACE | $([N/2]-1)$TH PHYSICAL PAGE | NTH PHYSICAL PAGE | N = ODD NUMBER |
| | | LOWER SURFACE | $[N/2]$TH PHYSICAL PAGE | NONE | |

2-TIME PAGE REPEAT PRINTING (LANDSCAPE)
+ FORMER/LATTER COMBINED PRINTING

F I G. 29
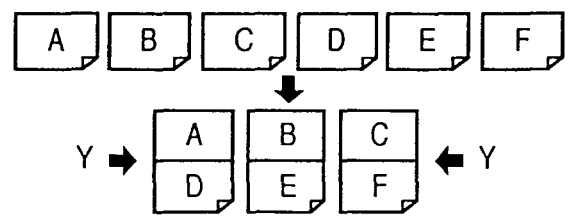
2-TIME PAGE REPEAT PRINTING (PORTRAIT)
+ FORMER/LATTER COMBINED PRINTING

FIG. 33A

DETAILED SETTING FOR DOCUMENT

| PAGE SETUP | FINISHING | EDIT | PAPER FEED | PRINT QUALITY |

PRINTING METHOD(Y):
- ◉ SINGLE-SIDED PRINTING
- ○ DOUBLE-SIDED PRINTING
- ○ BOOKBINDING PRINTING

PAGE REPEAT PRINTING(X): FORMER/LATTER COMBINED LAYOUT ~3301

☐ ALIGN CUT EDGES OF DOCUMENT ~3303

CUT EDGE(C): RIGHT OF DOCUMENT ~3302 xxxxxxxxxxxxxxxxxxxxxxxxxxx
xxxxxxxxxxxxxxxxxxxxxxxxxxx
xxxxxx

BINDING DIRECTION(B): ☐ LONG-SIDE BINDING (LEFT)

BINDING WIDTH(G): 0 mm (0~30)

ADJUST DOCUMENT(J):
- ◉ REDUCE IN ACCORDANCE WITH PRINTING REGION SET BY MARGIN
- ○ MOVE IN ACCORDANCE WITH BINDING WIDTH

SEGMENT CHAPTER(X): NOT DESIGNATE

[ RESTORE TO LATEST SAVE STATE(V) ]

[ OK ]  [ CANCEL ]  [ APPLY(A) ]  [ HELP(H) ]

3300

FORMER/LATTER COMBINED
PRINTING (LANDSCAPE)
CUT EDGE : LEFT

FORMER/LATTER COMBINED
PRINTING (LANDSCAPE)
CUT EDGE : RIGHT

FORMER/LATTER COMBINED PRINTING (PORTRAIT)
CUT EDGE : UPPER SIDE

FORMER/LATTER COMBINED PRINTING (PORTRAIT)
CUT EDGE : LOWER SIDE

DOCUMENT PROCESSING APPARATUS, DOCUMENT PROCESSING METHOD, AND DOCUMENT PROCESSING PROGRAM

FIELD OF THE INVENTION

The present invention relates to a document processing apparatus, document processing method, document processing program, and the like which combine output data generated by various programs (e.g., a document processing program and image editing program) into one document and provide a function of editing the document in a system made up of a printer and an information processing apparatus (e.g., a personal computer).

BACKGROUND OF THE INVENTION

Various application programs are provided in accordance with the types of data because different data types such as a character, table, and image require different structures for defining these data and different editing operations for these data. The user must use different applications for different data types: a character processing program for editing characters, a spreadsheet program for editing tables, and an image editing programs for editing images.

The user generally uses an application program corresponding to each data type. However, a document to be created by the user is usually not a document made up of only one type of data such as only characters, tables, or images, but a document made up of a plurality of types of data such as characters and tables or characters and images. In order to create a target document containing a plurality of types of data, the user utilizes the print functions of various applications, prints data by using the applications, and combines printed materials in a desirable order.

A program called "Office Suite" which forms one integrated application from various applications provides a function of combining data generated by respective applications into one document. The use of the integrated application allows the user to combine data created by respective applications into one target document by using a specific application included in the integrated application.

However, to assign page numbers to pages when the user creates one target document by combining printed materials generated by various applications, the user must print out all necessary data, combine them into a document, and then determine page numbers to be assigned. Each application writes determined page numbers on respective pages (to be referred to as logical pages or document pages) of a document created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed so that a plurality of document pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. Further, many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file and management such as editing and output is done for each file. The application function poses many constraints on setting the format of part of a document file. For example, the user must change format settings at each portion where the format is changed, and print a target page again. This leads to much labor and low productivity, similar to the above-mentioned method.

Recently, "page repeat printing" is proposed as a printing method used to print a document created using the integrated application. "Page repeat printing" is a function of laying out page data on a paper sheet and printing the data in order to output a printing result of a plurality of pages on one print medium (paper sheet) on the premise of cutting after printing. For example, print data of the same page is printed by a plurality of copies (e.g., two or four copies) on one paper sheet, and a printing result corresponding to a plurality of copies can be obtained from one paper sheet by one printing process.

One of "page repeat printing" methods is "former/latter combined printing" in which document data of different pages are laid out and the document is printed as former and latter halves arranged side by side on one paper sheet on the premise of cutting after printing, instead of arranging documents of the same page side by side on one paper sheet. When former/latter combined printing is applied to, e.g., a document of eight pages, different pages are paired and printed, like (1,5: the first page as the former half and the fifth page as the latter half), (2,6), (3,7), and (4,8), and the printed pages of the former and latter halves are superposed after cutting. The original document of a predetermined number of pages (total eight pages) can be reproduced in the same page order by the number (four) of output paper sheets which is half the number of pages.

Also, a technique of laying out a blank at a position corresponding to the final page plane when the total number of pages is odd in order to print a plurality of pages by bookbinding is disclosed in a patent reference (Japanese Patent Publication No. 08-5261).

Conventionally, former/latter combined printing executes special imposition and suffers many restraints on print setting. For example, the user must separately perform settings for former/latter combined printing of a document having inserting paper insertion setting, or alignment of cut edges after former/latter combined printing. This complicates operation and causes many printing operation errors.

If blank pages are uniformly inserted and a printing process is executed at the inserting paper setting, blank pages may be printed more than necessary. In the case of charging for each paper sheet, the user is futilely charged.

The present invention has been made in consideration of the above technical background, and has as its object to facilitate condition settings associated with the print form and increase output variations selectable as the print form when the user operates an apparatus in 2-time page repeat printing, 4-time page repeat printing, and former/latter combined printing.

It is another object of the present invention to perform imposition considering cutting after printing even for a document having the inserting paper setting, and prevent futile charging by controlling, e.g., the layout of blank pages.

SUMMARY OF THE INVENTION

To achieve the above objects, a document processing apparatus according to the present invention mainly comprises the following arrangement.

The above-described object of the present invention is achieved by a document processing apparatus which lays out page data that form a document by a plurality of pages on one print medium, and sets a print form of the document, comprising:

acquisition means for acquiring attribute information which is set for a document and contains an inserting paper setting when a layout of page data that form the document by a plurality of pages on one side of a print medium is set as a print form of the document;

determination means for determining, for respective pages of a plurality of page data laid out on one surface of the print medium, whether the inserting paper setting of inserting a print medium for a blank page from a paper feed portion different from a paper feed portion for another page has been set as an attribute of the page data in the attribute information acquired by the acquisition means; and layout control means for, when the determination means determines that the inserting paper setting has been set as an attribute of one page data among attributes of the plurality of page data laid out on one surface of the print medium, canceling the inserting paper setting and imposing a corresponding page as a blank region on the print medium.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes according to the embodiment;

FIG. 5 is a table showing a list of chapter attributes according to the embodiment;

FIG. 6 is a table showing a list of page attributes according to the embodiment;

FIG. 14 is a view showing an example of a dialog window for setting a whole document serving as the uppermost layer of the data structure;

FIG. 15 is a view showing an example of a dialog window for setting a chapter serving as the intermediate layer of the data structure;

FIG. 16 is a view showing an example of setting a unique attribute in the dialog window of FIG. 15;

FIG. 17 is a view showing an example of a dialog window for setting a page serving as the lowermost layer of the data structure;

FIGS. 20A and 20B are views showing an example of a user interface for performing detailed print settings for an existing document in the document processing system according to the embodiment of the present invention;

FIG. 21 is a view showing an example of a user interface for performing detailed print settings for an existing document in the document processing system according to the embodiment of the present invention;

FIG. 22 is a view showing an example of a setting window for performing an output paper setting for an existing document in the document processing system according to the embodiment of the present invention;

FIG. 26 is a table for explaining a former/latter combined printing process in the document processing system according to the embodiment of the present invention;

FIG. 27 is a table for explaining the former/latter combined printing process in the document processing system according to the embodiment of the present invention;

FIG. 29 is a view for explaining the former/latter combined printing process in the document processing system according to the embodiment of the present invention;

FIGS. 33A to 33C are views showing an example of a user interface for setting the former/latter combined printing process for a document in the document processing system according to the embodiment of the present invention;

DETAILED DESCRIPTION OF THE PREFERRED EMBODIMENT

A preferred embodiment of the present invention will now be described in detail in accordance with the accompanying drawings.

[Outline of Document Processing System]

The outline of a document processing system according to the first embodiment of the present invention will be described with reference to FIGS. 1 to 13. In the document processing system, a data file created by a general application is converted into an electronic document file by an electronic document writer. A bookbinding application provides a function of editing the electronic document file. In the embodiment, a general application, electronic document writer, bookbinding application, and electronic document de-spooler are separately described for distinction between these functions. However, a package provided to the user is not limited to them, and an application or graphic engine as a combination of them may be provided, details of which will be described below.

[Example of Software Configuration of Document Processing System]

Figure 1:
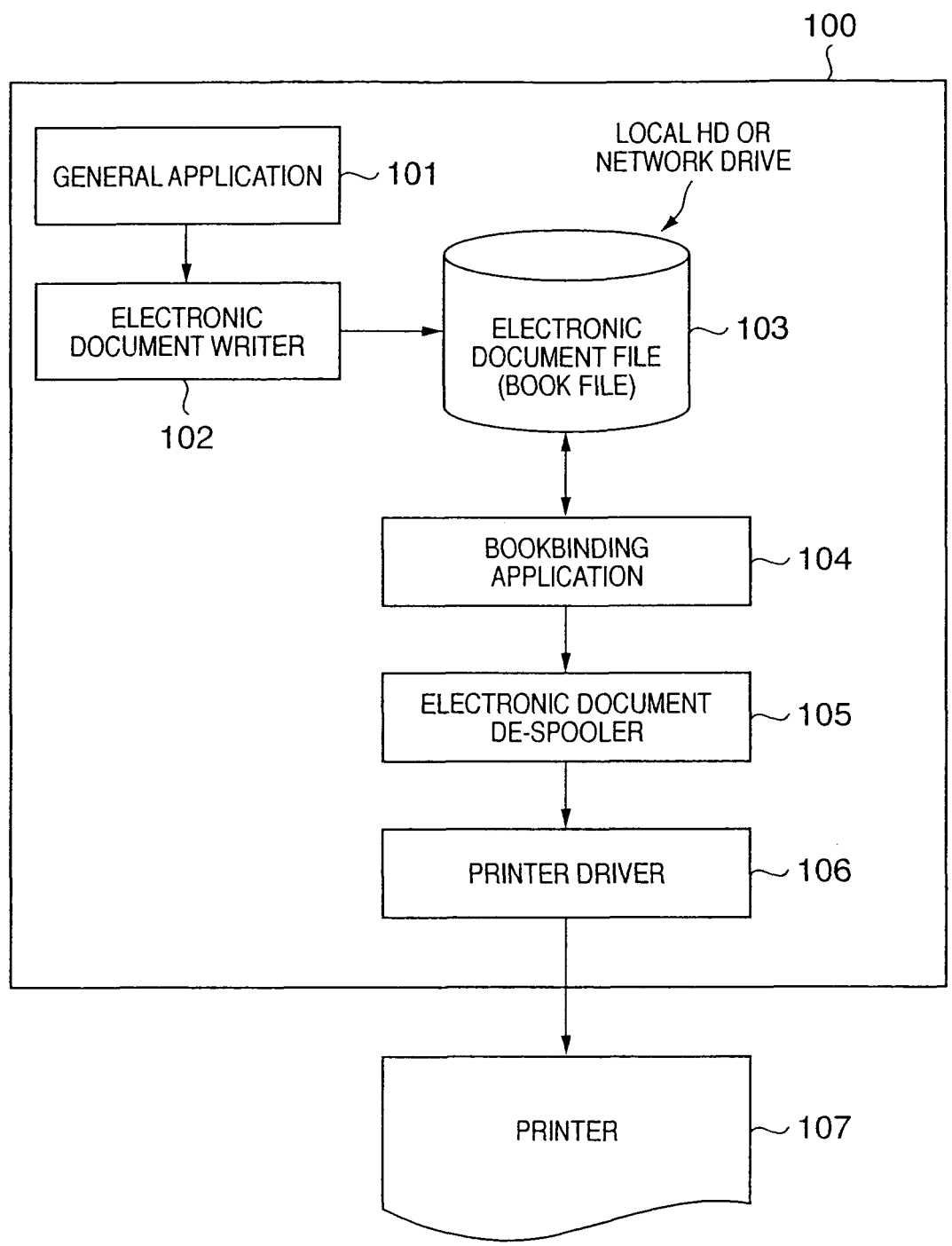
FIG. 1 is a block diagram showing an example of the software configuration of a stand-alone document processing system according to an embodiment of the present invention.

FIG. 1 is a block diagram showing the software configuration of the document processing system according to the embodiment.

The document processing system is implemented by a digital computer 100 (to be also referred to as a "host computer" hereafter) as a suitable embodiment of a document processing apparatus (information processing apparatus) according to the present invention. A general application 101 is an application program which provides functions such as wordprocessing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an output command of a format processible by a bookbinding application 104 or printer driver 106 (to be described later). The format (to be referred to as an "electronic document format" hereinafter) converted by the electronic document writer 102 is not particularly limited as far as each document page can be expressed by a detailed format. Of substantial standard formats, for example, the PDF format by Adobe Systems and the SVG format can be adopted as electronic document formats.

When the application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the bookbinding application 104, and executes conversion of application data into an electronic document file under the management of the bookbinding application 104. The bookbinding application 104 completes a new incomplete electronic document file generated by the electronic document writer 102 as an electronic document file having the following format. In case of necessity to definitely discriminate these files, a file created by the electronic document writer 102 will be called an electronic document file, and an electronic document file given a structure by the bookbinding application will be called a book file. If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as an electronic document file 103 in a storage medium such as a hard disk. The hard disk may be the local drive of the computer which implements the document processing system according to the embodiment, or when the computer is connected to a network, may be a drive provided on the network.

The bookbinding application 104 provides the user with a function of reading and editing the electronic document file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic document de-spooler 105. The electronic document de-spooler 105 is a program module which is installed in the computer together with the bookbinding application. The electronic document de-spooler 105 is used to output drawing data to a printer driver in printing a document (book file) used by the bookbinding application. The electronic document de-spooler 105 reads out a designated book file (electronic document file) from the hard disk. To print each page in a format described in the book file (electronic document file), the electronic document de-spooler 105 generates an output command complying with the output module of the OS described above, and outputs the command to the output module (not shown). At this time, the driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

[Example of Hardware Configuration of Document Processing System]

Figure 2:
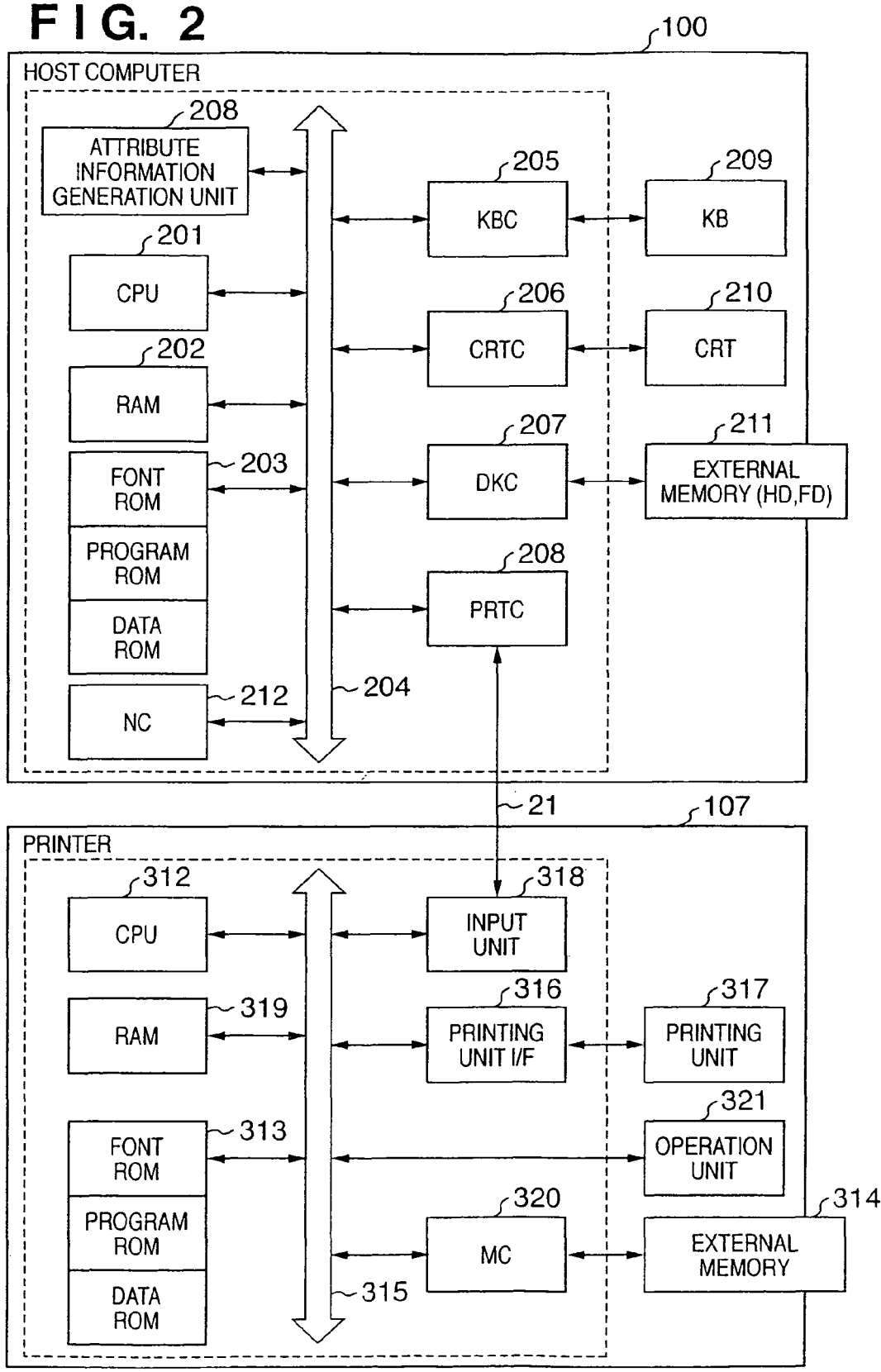
FIG. 2 is a block diagram showing an example of a hardware configuration which implements the document processing system according to the embodiment of the present invention.

FIG. 2 is a block diagram showing the hardware configuration of the document processing system according to the embodiment. In FIG. 2, the host computer 100 comprises a CPU 201 which executes a process for a document containing figures, images, characters, tables (including spreadsheets and the like), and the like on the basis of a document processing program or the like stored in a program ROM within a ROM 203 or an external memory 211. The CPU 201 comprehensively controls devices connected to a system bus 204. The program ROM within the ROM 203 or the external memory 211 stores e.g., an operating system program serving as the control program of the CPU 201. A font ROM within the ROM 203 or the external memory 211 stores, e.g., font data used in the document process. A data ROM within the ROM 203 or the external memory 211 stores various data used in the document process or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or flexible disk (FD) which stores a boot program, various applications, font data, user files, edited files, a printer control command generation program (to be referred to as a printer driver hereinafter), and the like. A printer controller (PRTC)) 208 is connected to the printer 107 via a bidirectional interface (interface) 21, and executes a communication control process with the printer 107. An NC 212 is connected to a network, and executes a communication control process with another device connected to the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a mouse cursor (not shown) or the like. When the user executes printing, he/she opens a print setting window, and can perform setting of a printer and setting of a printing process method to the printer driver that includes selection of a print mode.

The printer 107 is controlled by a CPU 312. The printer CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g. the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel described above which has operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

[Example of Format of Electronic Document Data]

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Print data from the general application 101 is saved as the electronic document file 103 in the system via the electronic document writer 102. The electronic document file 103 contains content data of a print material, print setting data, and the like. Content data of a print material is data prepared by converting data created in an application by the user into an intermediate code. Print setting data is data which describes how to output content data (output form or the like).

Figure 3:
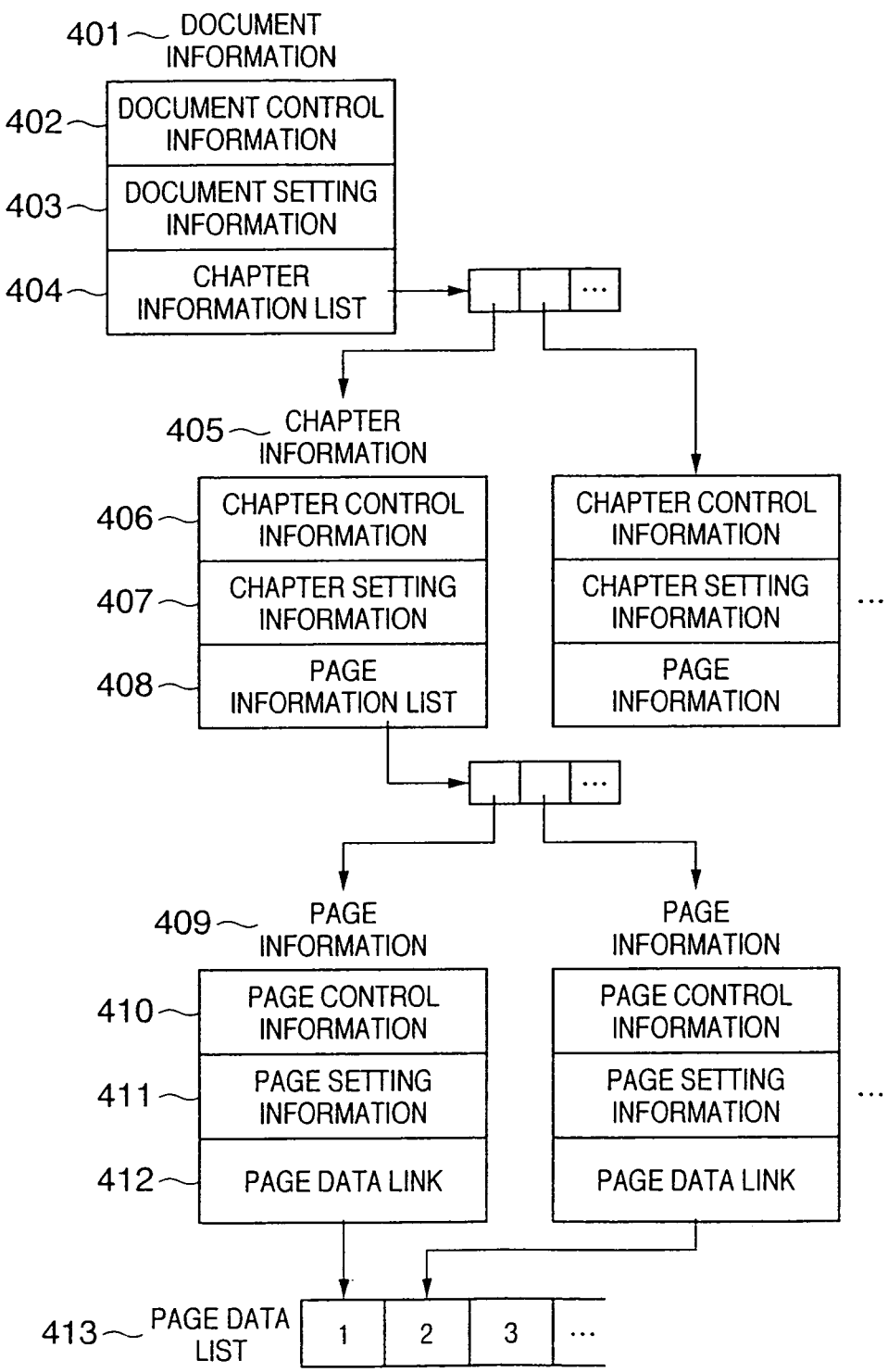
FIG. 3 is a view showing an example of a book file structure according to the embodiment.

FIG. 3 is a block diagram schematically showing an example of the book file format. The book file format is based on print setting data. A book, chapter, and page in the book file are represented by corresponding nodes. One book file contains one book. The book and chapter are a concept for defining a book structure, and contain, as entities, defined attribute values and links to lower layers. The page has, as entities, data of each page output from an application program. The page contains a document page entity (document page data) and a link to each document page data in addition to an attribute value. Note that a print page to be output to a paper medium may contain a plurality of document pages. This structure is displayed not by a link, but by attributes in book, chapter, and page layers.

In FIG. 3, a book file need not be one completed book, and "book" is generalized as "document".

Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2-up layout and the remaining chapters have a 4-up layout. The page information list 408 holds as a list a set of document pages which form each chapter. The page information list 408 designates page information data 409.

The page information data 409 can also be roughly divided into three parts 410 to 412. The page control information 410 holds information such as a page number displayed at the tree. The page setting information 411 holds information such as the page rotation angle and page layout position information, and corresponds to document page attributes. The page link information 412 is document data corresponding to a page. In this example, the page information 409 does not directly have document data, but has only the link information 412. Actual document data is held by a page data list 413.

FIGS. 4A and 4B show a list representing an example of the book attribute (document setting information 403). In general, as for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined on the lower layer. In this example, however, whether to preferentially adopt the attribute value of a lower layer can be selected (to be described later). Each item shown in FIGS. 4A and 4B does not correspond to one concrete item, but may contain a plurality of relevant items.

Items unique to the book attribute are seven items: printing method, details of bookbinding, front/back cover, index paper, inserting paper, chapter segmentation, and page repeat printing. These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index paper attribute includes designation of inserting tabbed index paper separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting paper attribute.

The inserting paper attribute includes designation of inserting a paper sheet fed from an inserter or sheet feed cassette for chapter segmentation, and designation of a sheet feed source when inserting paper is inserted.

The chapter segmentation attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

The page repeat printing attribute allows setting 2-time page repeat printing and 4-time page repeat printing of printing a plurality of pages on one print medium (paper sheet) in printing an electronic document file combined as a book, and former/latter combined printing of laying out documents corresponding to different pages on former and latter halves of one paper sheet and printing the documents. Page repeat printing will be explained in detail later, and a description thereof will be omitted here.

FIG. 5 shows a list representing an example of the chapter attribute (chapter setting information 407), and FIG. 6 shows a list representing an example of the page attribute (page setting information 411). The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are five items: paper size, paper orientation, N-up printing designation, enlargement/reduction, and delivery method. The N-up printing designation attribute is an item for designating the number of document pages contained in one print page. Layouts which can be designated are 1×1, 1×2, 2×2, 3×3, 4×4, and the like. The delivery method attribute is an item for designating whether to staple discharged paper sheets. Among them all, the effectiveness of this attribute depends on whether a printing apparatus for use has a stapling function.

Items unique to the page attribute are a page rotation attribute, zoom, layout designation, annotation, and page separation. The page rotation attribute is an item for designating the rotation angle when a document page is laid out on a print page. The zoom attribute is an item for designating the variable magnification ratio of a document page. The variable magnification ratio is designated based on a virtual logical page region size=100%. The virtual logical page region is a region occupied by one document page when document pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

[Example of Operation Sequence of Document Processing System]

(Example of Book File Generation Sequence)

The book file has the above-described structure and contents. A sequence of creating a book file by the bookbinding application 104 and electronic document writer 102 will be explained. Creation of a book file is realized as part of book file editing operation by the bookbinding application 104.

Figure 7:
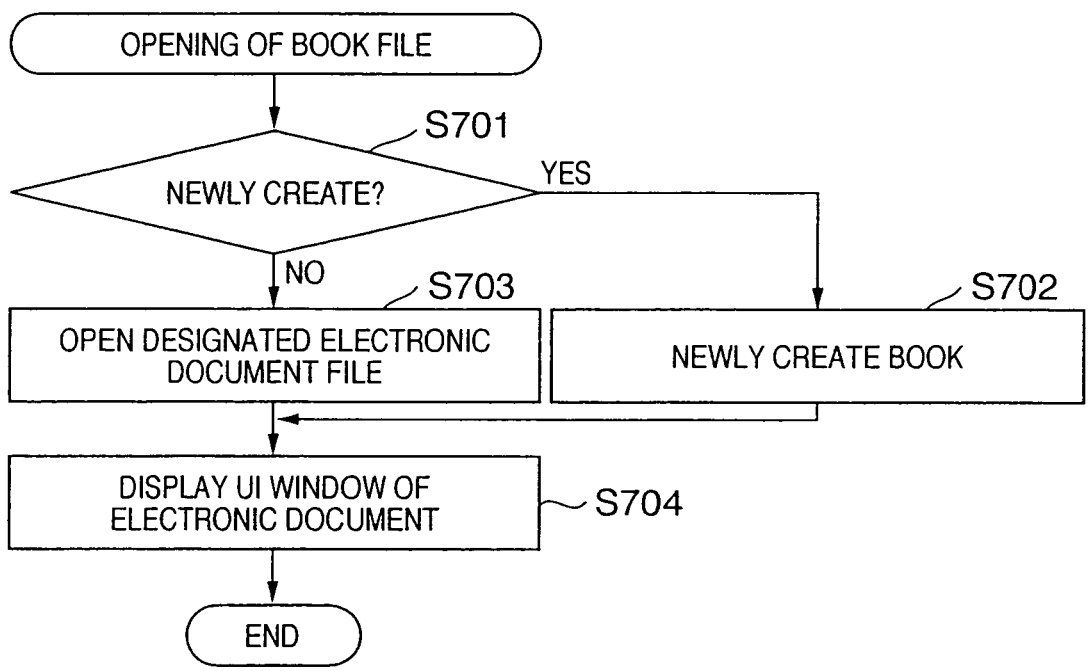
FIG. 7 is a flowchart showing an example of a sequence of opening a book file in the document processing system according to the embodiment.

FIG. 7 is a flowchart showing a sequence when the bookbinding application 104 opens a book file.

Figure 8:
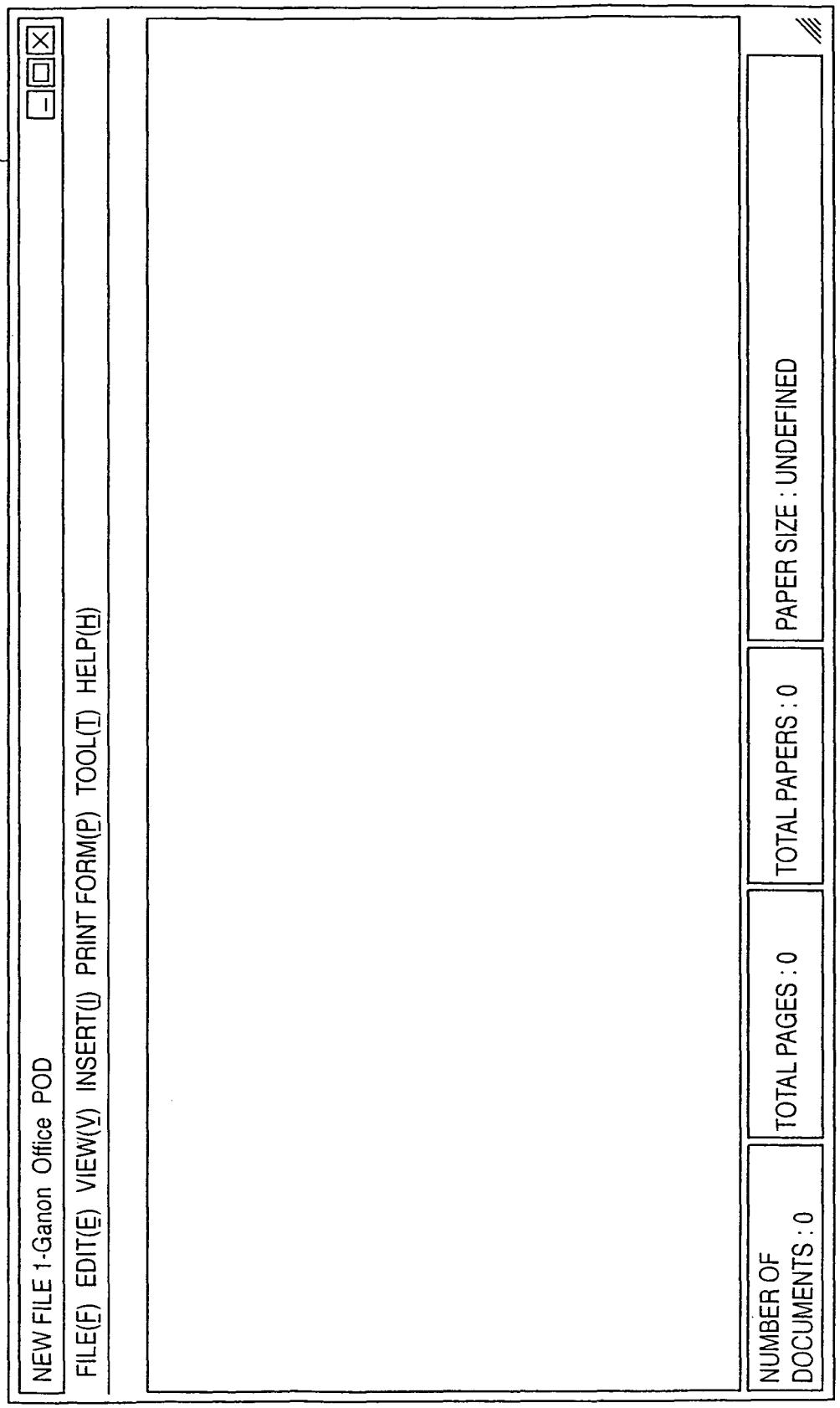
FIG. 8 is a view showing an example of a user interface window when a new book file is opened.

Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. Applied book attributes are a set of attributes which are prepared in advance for creation of a new file. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
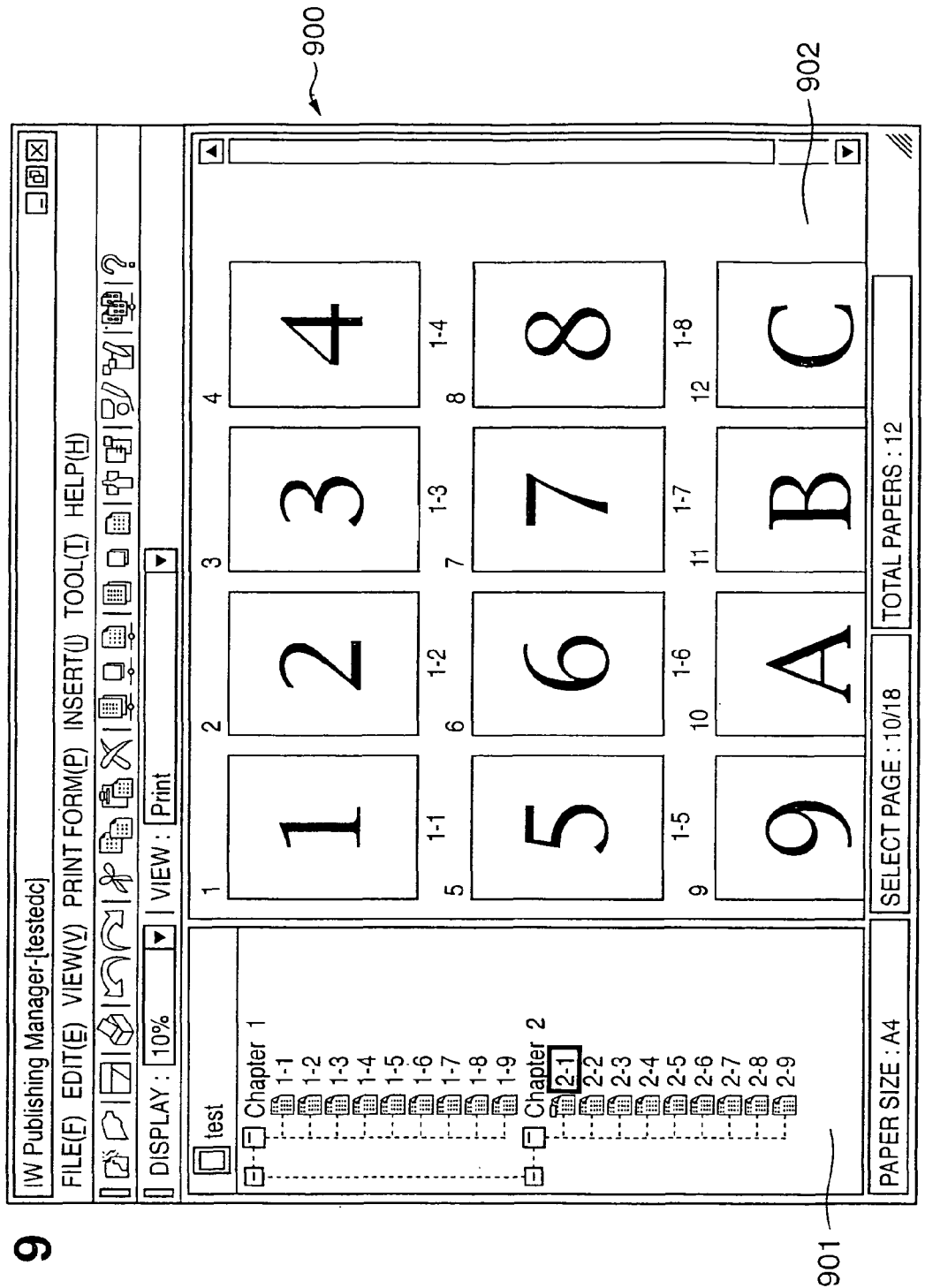
FIG. 9 is a view showing an example of a user interface window when an existing book file is opened.

If the book file is an existing one, a designated book file is opened (step S703), and a UI (User Interface) window is displayed in accordance with the structure, attributes, and contents of the book file. FIG. 9 is a view showing an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are document pages. The preview portion 902 displays reduced print page contents. The display order reflects the book structure.

Application data converted into an electronic document file by the electronic document writer 102 can be added as a new chapter to the open book file. This function is called an electronic document import function. The electronic document is imported to the book file newly created by the sequence of FIG. 7, giving an entity to the book file. This function is activated by dragging and dropping application data in the window of FIG. 8 or 9.

Figure 10:
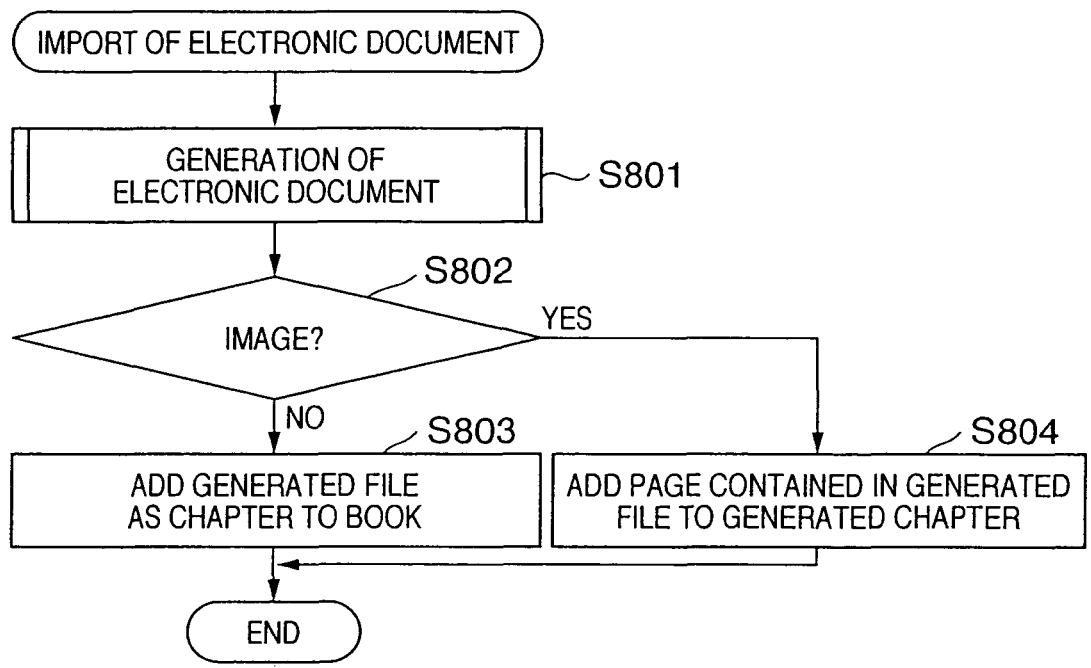
FIG. 10 is a flowchart showing an example of a sequence of importing an electronic document file to a book file in the document processing system according to the embodiment.

FIG. 10 is a flowchart showing an example of an electronic document import sequence.

An application program which has generated designated application data is activated. The electronic document writer 102 is designated as a device driver, and application data is printed out to convert the data into electronic document data (step S801). After conversion, whether the converted data is image data is determined (step S802). This determination can be done on the basis of the file extension of application data under the Windows OS. For example, an extension "bmp" represents Windows bitmap data; "jpg", jpeg-compressed image data; and "tiff", tiff-format image data. Such image data can directly generate an electronic document file without activating any application, unlike S801, and thus the process in S801 can be omitted.

If the data is not image data, the electronic document file generated in step S801 is added as a new chapter to the book of a currently open book file (step S803). As for chapter attributes which are common to book attributes, the values of the book attributes are generally copied. As for unique chapter attributes, predetermined default values are set. In this example, whether to preferentially adopt the attribute value of a lower layer can be selected (to be described later).

If the data is image data, no new chapter is added in principle, and each document page contained in the electronic document file generated in step S801 is added to a designated chapter (step S804). If the book file is a newly created one, a new chapter is created, and each page of the electronic document file is added as a page belonging to the chapter. As for page attributes, attributes common to the attributes of an upper layer are generally given the attribute values of the upper layer, and attributes which are defined in application data and inherited to an electronic document file are given values defined in the application data. For example, when N-up designation is defined in application data, the page inherits this attribute value. In this way, a new book file is created, or a new chapter is added. In this example, however, whether to preferentially adopt the attribute value of a lower layer can be selected (to be described later).

Figure 11:
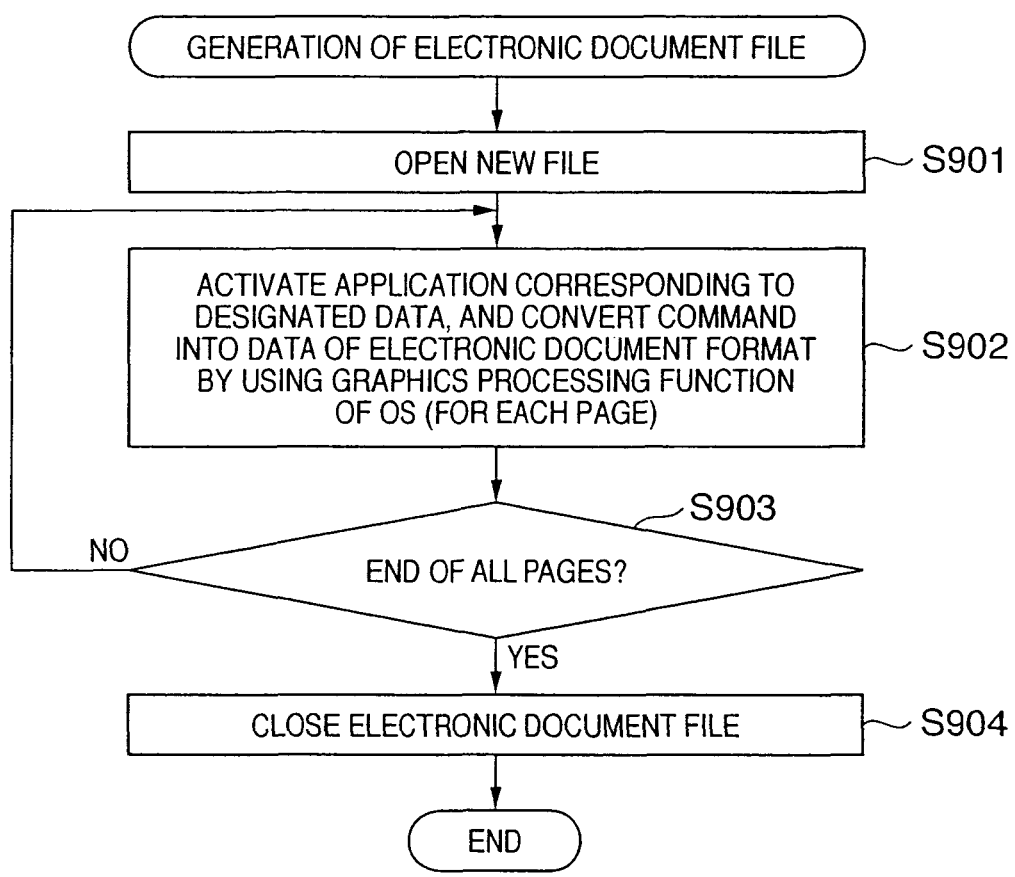
FIG. 11 is a flowchart showing an example of a sequence of converting application data into an electronic document file in step S801 of FIG. 10.

FIG. 11 is a flowchart showing a sequence of generating an electronic document file by the electronic document writer 102 in step S801 of FIG. 10.

A new electronic document file is created and opened (step S901). An application corresponding to designated application data is activated. The electronic document writer 102 is set as a device driver to transmit an output command to an OS output module. The output module converts the received output command into data of an electronic document format by the electronic document writer, and outputs the converted data (step S902). The output destination is the electronic document file opened in step S901. Whether all designated data have been converted is determined (step S903), and if YES in step S903, the electronic document file is closed (step S904). The electronic document file generated by the electronic document writer 102 is a file containing document page data entities shown in FIG. 3.

(Example of Editing Book File)

As described above, a book file can be created from application data. Chapters and pages in the generated book file can be edited as follows.

(1) New document
(2) Delete
(3) Copy
(4) Cut
(5) Paste
(6) Move
(7) Change chapter name
(8) Reassign page number/name
(9) Insert cover
(10) Insert inserting paper
(11) Insert index paper
(12) Page layout of each document page In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of a document page, and insertion of inserting paper and index paper. By these operations, operation results are reflected in attributes shown in FIGS. 4A to 6 or in the structures of the book file. For example, a blank page is inserted to a designated portion by an operation of newly adding a blank page. The blank page is processed as a document page. If the layout of a document page is changed, the change contents are reflected in attributes such as the printing method, N-up printing, front/back cover, index paper, inserting paper, and chapter segmentation. A display and operation example in editing will be described in detail below.

(Example of Output of Book File)

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a job ticket from a currently open book file, and transfers the job ticket to the electronic document de-spooler 105. The electronic document de-spooler 105 converts the job ticket into an OS output command, e.g., a Windows® GDI command, and transmits the command to an output module, e.g., GDI. The output module generates a command complying with a device by the designated printer driver 106, and transmits the command to the device.

The graphic engine of the output module (not shown) loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

The job ticket is data having a structure whose minimum unit is a document page. The structure of the job ticket defines the layout of a document page on a paper sheet. One job ticket is issued for one print job. The document node is set at the top of the structure, and defines the attribute of the whole document such as double-sided printing/single-sided printing or page repeat printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. A document page to be laid out on a physical page belongs to the physical page. The physical page attribute contains a document page layout.

Figure 12:
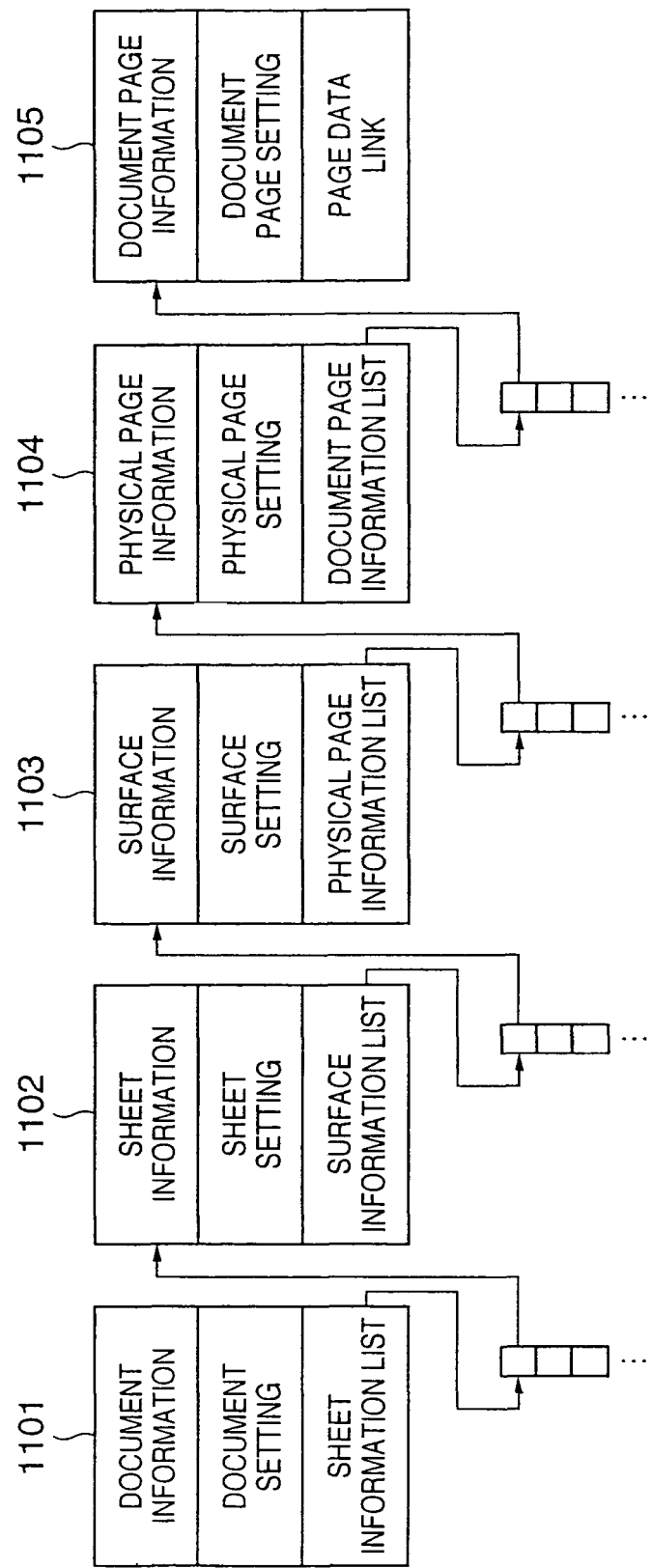
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out a document, and each physical page is formed from a set of document pages serving as minimum units. Reference numeral 1101 denotes data corresponding to a document. The data 1101 is made up of data on a whole document and a list of sheet information forming the document. Sheet information 1102 is formed from information on a sheet such as the sheet size, and a list of surface information laid out on the sheet. Surface information 1103 is formed from data unique to a surface, and a list of physical pages laid out on the surface. Physical page information 1104 is formed from information such as the size and header/footer of a physical page, and a list of document pages which form the physical page.

The electronic document de-spooler 105 creates a table (corresponding to a job ticket in FIG. 12 expressed as a table) called a de-spool table from the job ticket of an electronic document file. The electronic document de-spooler 105 converts the de-spool table into an output command to an output module in accordance with attributes and print settings defined in an editing information file.

(Example of Preview Display Contents)

As described above, when a book file is opened by the bookbinding application, the user interface window 900 shown in FIG. 9 is displayed. The tree portion 901 displays a tree representing the structure of the open book (to be referred to as a "book of interest" hereinafter). At the preview portion, three display methods are prepared in accordance with designation by the user. The first method is a mode called a document view which directly displays document pages. In the document view mode, the contents of document pages belonging to the book of interest are reduced and displayed. The display of the preview portion does not reflect any layout. The second method is a printing view mode. In the printing view mode, the preview portion 902 displays document pages in a format which reflects the layout of them. The third method is a simple printing view mode. In the simple printing view mode, the contents of document pages are not reflected in the display of the preview portion, but only the layout is reflected.

[Another Example of Configuration of Document Processing System]

The document processing system according to the embodiment is of a stand-alone type. A server-client system as an extension of the stand-alone system also creates and edits a book file by almost the same configuration and sequence. A book file and printing process are managed by the server.

Figure 13:
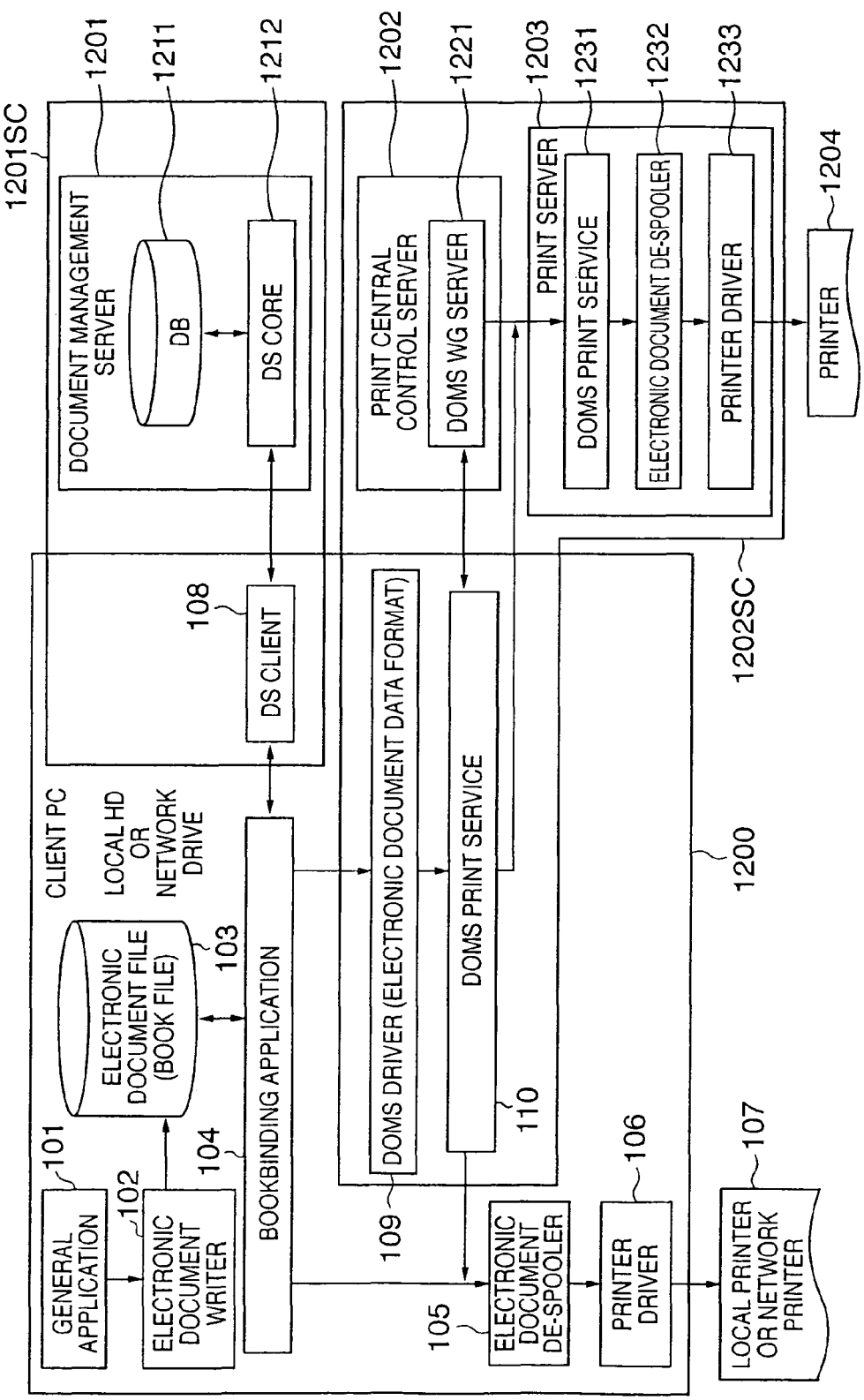
FIG. 13 is a block diagram showing an example of the software configuration of a client-server document processing system.

FIG. 13 is a block diagram showing the configuration of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, print central control server 1202, and print server 1203. These servers are generally connected to the client document processing system via a network. When the servers also function as clients, they are connected by interprocess communication which simulates communication between networks. The document management server 1201 and print central control server 1202 are connected to the client in FIG. 13, but only either one may exist on the network. If the connected server is the document management server, a document management server-client system 1201SC including a client module is added to the stand-alone document management system. If the connected server is the print central control server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 108 and a DS core 1212.

The print central control server 1202 manages printing of a book file stored in the client document processing system 1200 or document management server 1201. A print request from the client is transmitted to a DOMS WG server module 1221 of the print central control server 1202 via the DOMS driver 109 and DOMS print service module 110. To print by the printer of the client, the print central control server 1202 transfers electronic document data to the electronic document de-spooler 105 via the DOMS print service module 113 of the client. To print by the print server 1203, the print central control server 1202 transmits electronic document data to a DOMS print service module 1231 of the print server 1203. For example, the print central control server executes security check on the qualification of a user who has issued a print request for a saved book file, or saves the printing process log. In this fashion, the document processing system can be implemented as both a stand-alone system and client-server system.

[Example of Editing Operation of Document Processing System]

FIG. 9 shows the operation window of the bookbinding application 104. The bookbinding application can set the function of a printing apparatus such as stapling, in addition to editing such as a change of the page order of a document, copying, and delete. The bookbinding application can cause a designated printing apparatus to print. A tree view representing a document structure is displayed in the left region of FIG. 9. A document is formed from a set of chapters, and each chapter is formed from a set of document pages. The print preview of each page is displayed in the right region of FIG. 9.

[Example of Attribute Setting of Document Processing System]

FIG. 14 shows a "Detailed Setting for Document" window 1400 of the bookbinding application 104. This window allows displaying/setting the "document setting information 403". This window is activated from the "Detailed Setting for Document" menu of a Print Form menu in the application operation window of FIG. 9 or a "Detailed Setting for Document" button on the tool bar. The "Detailed Setting for Document" window is a window for setting attributes which influence a whole document. This window is formed from four sheets Page Setup, Decoration, Edit, and Paper Source. FIG. 14 shows a state in which the Page Setup sheet is displayed. In the Page Setup sheet, settings mainly concerning the layout can be done. Settings such as the paper size, orientation, and N-page printing can be designated. This window has check box controls 1401 and 1402 for the zoom.

FIG. 15 shows a "Detailed Setting for Chapter" window 1500 of the bookbinding application 104. This window allows displaying/setting the "chapter setting information 407". This window is activated from the "Detailed Setting for Chapter" menu of a Print Form menu in the application operation window of FIG. 9 or a "Detailed Setting for Chapter" button on the tool bar. The "Detailed Setting for Chapter" window is a window for setting attributes unique to a chapter. This window is formed from four sheets Page Setup, Decoration, Edit, and Paper Source. FIG. 15 shows a state in which the Page Setup sheet is displayed. In the Page Setup sheet, settings mainly concerning a layout unique to each chapter can be done. Settings such as the paper size, orientation, and N-page printing can be designated. "Follow Book Attribute" check box controls 1501, 1502, and 1503 are arranged for repetitive setting items between "Detailed Setting for Document" and "Detailed Setting for Chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "Detailed Setting for Chapter" in FIG. 15 are not checked. In this case, even if the whole document uses A3 paper, pages which constitute this chapter use A4 paper. As for the layout, even if the document designates 1 page per sheet, the chapter designates a layout of 4 pages per sheet. "MS Arrange" is checked, and the setting values of the document in the upper layer are employed as those of the chapter.

Figure 18:
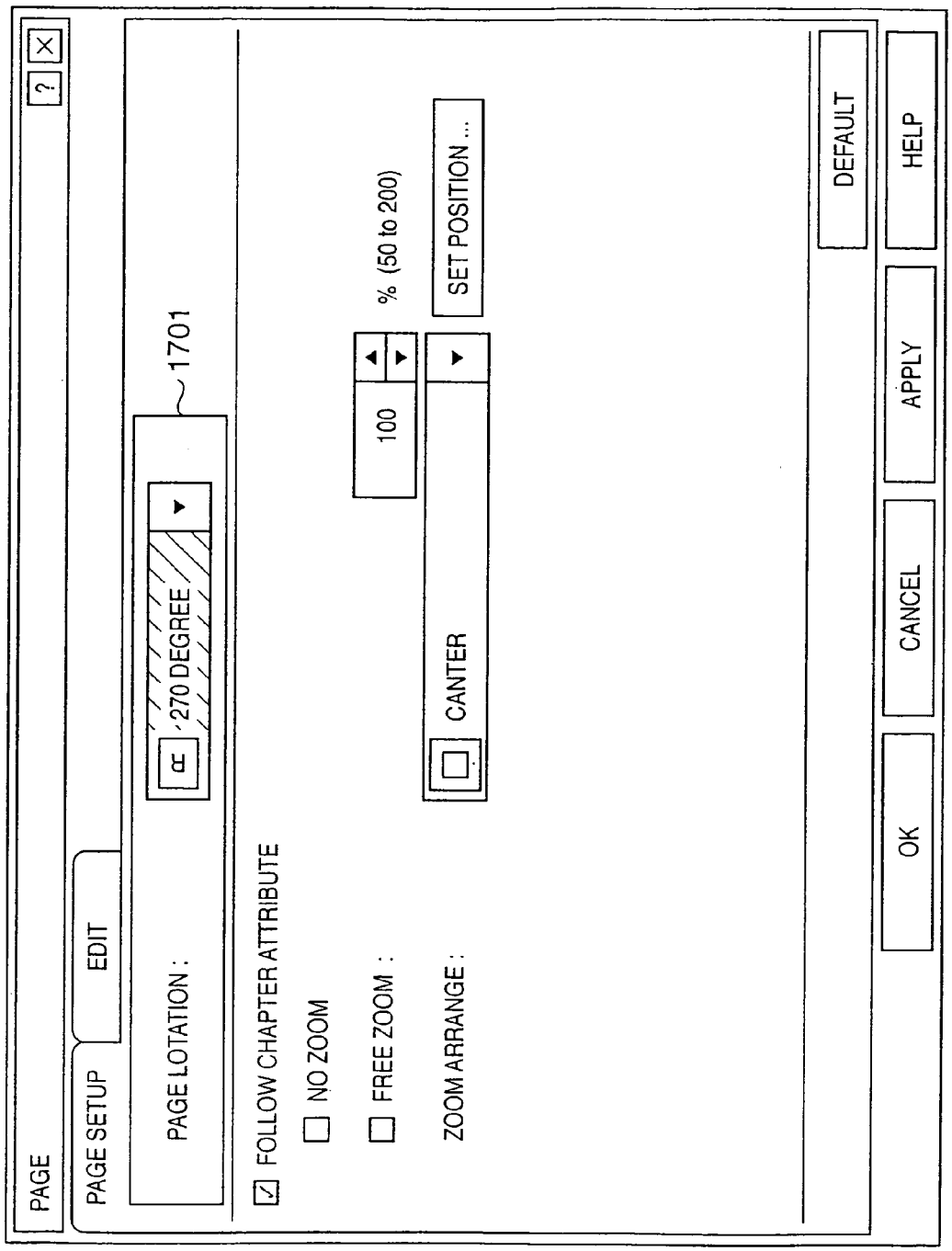
FIG. 18 is a view showing an example of changing a setting value in the dialog window of FIG. 17.

FIG. 17 shows a "Detailed Setting for Page" window 1700 of the bookbinding application 104. This window allows displaying/setting the "page setting information 411". This window is activated from the "Detailed Setting for Page" menu of the Print Form menu in the application operation window of FIG. 9 or a "Detailed Setting for Page" button on the tool bar. The "Detailed Setting for Page" window is a window for setting attributes unique to each page. This window is formed from two sheets Page Setup and Edit. FIG. 17 shows a state in which the Page Setup sheet is displayed. In the Page Setup sheet, settings mainly concerning a layout unique to each page can be done, and settings such as the rotation angle and enlargement/reduction ratio in laying out a document page can be designated. A "Follow Chapter Attribute" check box control 1701 is arranged for repetitive setting items between "Detailed Setting for Chapter" and "Detailed Setting for Page". For an item whose check box is checked, the setting value of the chapter is applied to the page. FIG. 18 shows a case wherein the check box is not checked.

FIG. 18 shows a state in which Page Rotation setting is changed in "Detailed Setting for Page" of FIG. 17. The control 1701 exhibits a setting of rotating and arranging a document page with the upper portion of the page oriented left in laying out the document page. Since this item is not provided with any "Follow Chapter Attribute" check box and is not a repetitive setting item in the chapter and document, the setting displayed in this window is always adopted as the setting value of the page. When the control 1701 is set, the "Arrange" item is a repetitive setting item in the chapter, and the setting value of the chapter is used as that of the page. When "Follow Document Attribute" is checked in the "Arrange" item of the chapter, the setting value of the document in the upper layer is used as that of the chapter, and thus the setting value of the document is used as that of the page. When the "Arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

[Example of Document Editing Display of Document Processing System]

Figure 19:
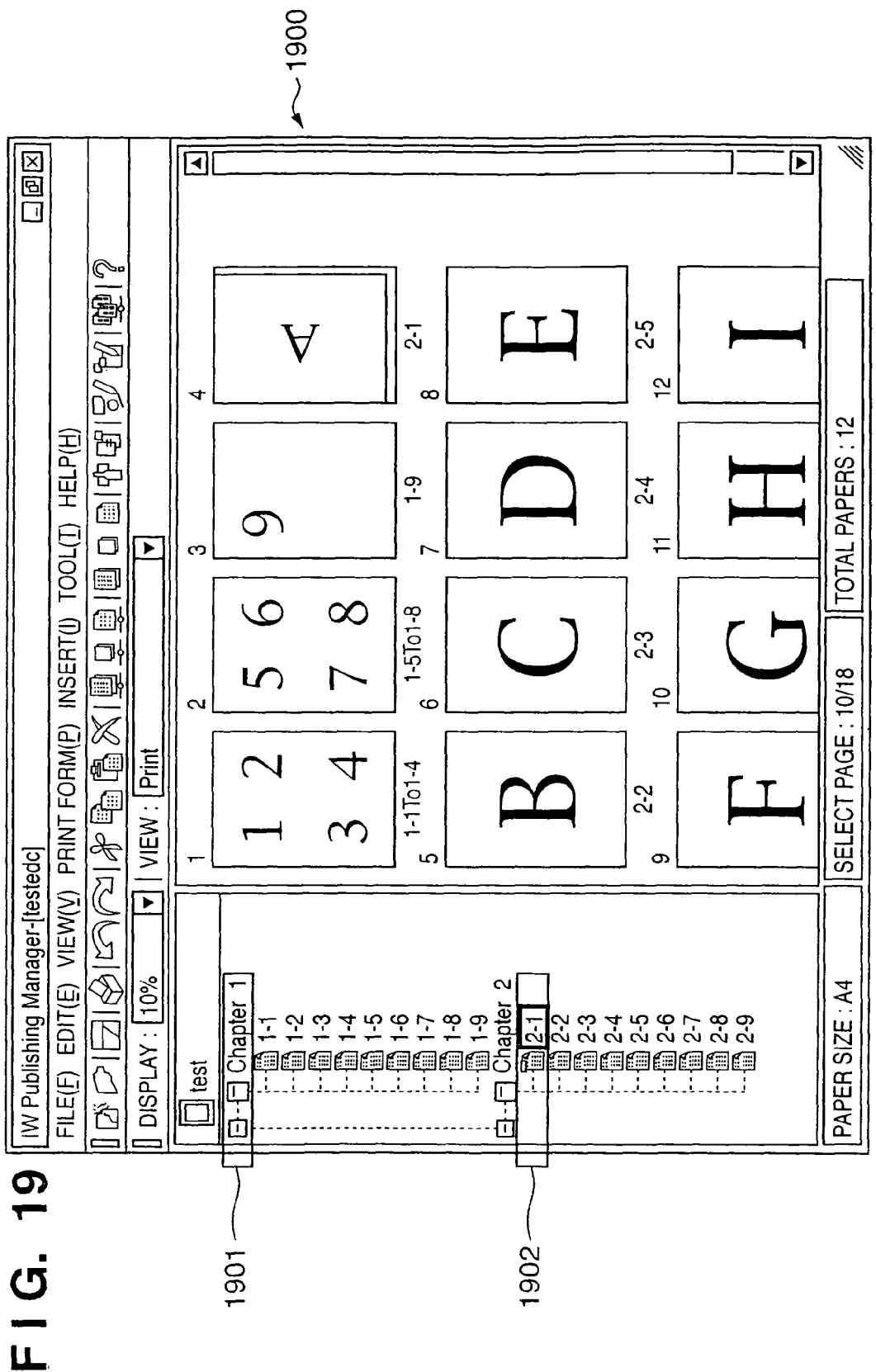
FIG. 19 is a view showing an example of display when settings unique to a chapter and page are done.

FIG. 19 shows an example of the display format of the application when a setting item which is repeated in an upper layer does not use a setting value in the upper layer, i.e., when the check box control 1501 or 1701 is not checked.

In the example of FIG. 19, a document is formed from two chapters, and each chapter has document data of nine pages. FIG. 19 shows a display example when the layout of the first chapter is 4UP (to be also referred to as 4in1 hereinafter) and rotation is designated for the first page (10th page in the whole document) of the second chapter. In the right preview, four document pages are laid out on each of the first to third pages. On the fourth page, a character "A" is rotated. A display format for settings unique to a chapter and page at a tree view will be explained. An icon 1901 corresponding to the first chapter changes to exhibit that this chapter has a unique setting. An icon 1902 corresponding to the first page of the second chapter also changes to exhibit that this page has a special setting.

[Former/Latter Combined Printing Executed by Document Processing Apparatus]

Page repeat printing executed for a document having the inserting paper setting in the document processing apparatus according to the embodiment will be explained. Page repeat printing provided by the bookbinding application 104 will be described with reference to FIGS. 20A, 20B, 21, and 22.

Figure 20A:
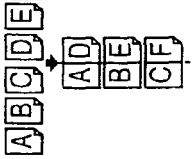

FIG. 20A is a view illustrating a "Finishing" sheet 2000 of the "Detailed Setting for Document" window of the bookbinding application 104. In order to apply page repeat printing as a printing method, the user can select one of "none/2-time page repeat printing/4-time page repeat printing/former/latter combined printing" from the display of a pull-down menu 2001 (see FIG. 20B). When the user selects one of "2-time page repeat printing/4-time page repeat printing/former/latter combined printing" from the display of the pull-down menu 2001, an attribute information generation unit 212 generates or updates attribute information of a document in accordance with the selection. When the user operates the apparatus in 2-time page repeat printing, 4-time page repeat printing, and former/latter combined printing, detailed condition settings associated with the print form are facilitated, and output variations selectable as the print form can be increased.

Attribute information generated or updated by the attribute information generation unit 212 is reflected in the document setting information 403 (FIG. 3 and No. 15 in FIG. 4B). The bookbinding application 104 refers to the attribute information in executing page imposition. The attribute information generation unit 212 may be configured as a hardware resource in the host computer 100, or stored in the program ROM 203 or external memory 211 as a software module which is activated in response to a selection input by the user via the keyboard 209.

In the window display of FIG. 20A, input areas 2002 and 2003 are used for settings for aligning edges of paper sheets cut after 2-time page repeat printing, 4-time page repeat printing, or former/latter combined printing selected as page repeat printing. The contents overlap a description of FIG. 33A (to be described later in detail), and a description thereof will be omitted.

FIG. 21 is a view illustrating a "Page Setup" sheet 2100 of the "Detailed Setting for Document" window of the bookbinding application 104. An area 2101 in the Page Setup sheet is used to select an output paper size. In the example of FIG. 21, "A4 (A5 document×2)" is selected, and the bookbinding application 104 imposes an A5-size document two times on an A4-size paper sheet on the basis of the setting. FIG. 22 is a view showing a display example of concrete output paper sizes displayed as a pull-down menu in the area 2101 of FIG. 21. The paper setting in page repeat printing is not limited to 2-time imposition of an A5-size document on an A4-size paper sheet shown in FIG. 21, and various paper sizes can be selected, as shown in FIG. 22. For example, when a B4-size paper sheet is selected for 2-time page repeat printing, the attribute information generation unit 212 generates or updates attribute information on the orientation (portrait or landscape) of the output paper sheet and the size of the output paper sheet as attribute information of a document in accordance with the selection, and reflects the attribute information in the document setting information 403. In this case, the bookbinding application 104 can impose a B5-size document two times on a B4-size output paper sheet newly selected in accordance with the attribute information.

When the user operates the apparatus, condition settings associated with selection of the orientation of the output paper sheet and the paper size as the print form are facilitated, and output variations selectable as the print form can be increased.

Figure 23A:
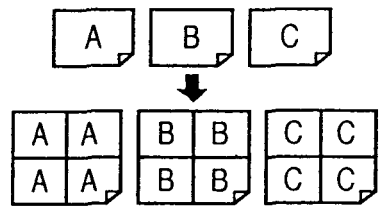
FIGS. 23A to 23D are views showing an example for explaining page repeat printing in the document processing system according to the embodiment of the present invention.
Figure 23B:
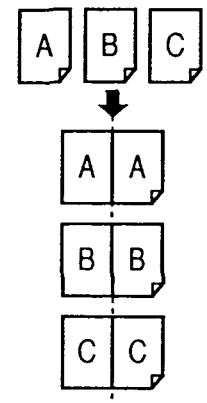
Figure 23C:
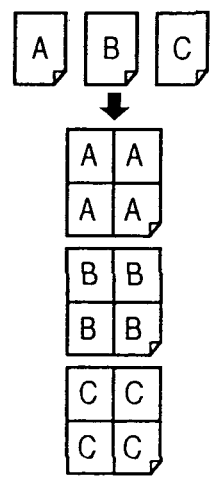
Figure 23D:
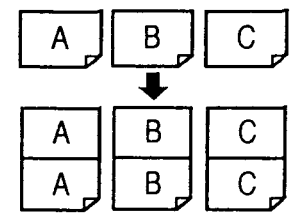

FIGS. 23A to 23D are views schematically showing page repeat printing results when page repeat printing is actually executed for a document containing document pages A, B, and C. FIG. 23A is a view showing a printing result when the orientation of the output paper sheet is set to landscape in the setting window of FIG. 21 and 4-time page repeat printing is selected in the area 2001 of FIG. 20A. The bookbinding application 104 imposes the same document four times on one paper sheet in 4-time page repeat printing. FIG. 23C shows an example of 4-time page repeat printing when the orientation of the output paper sheet is set to portrait in the setting window of FIG. 21. The bookbinding application 104 imposes the same document four times on one portrait paper sheet. FIG. 23B shows 2-time page repeat printing selected when the orientation of the output paper sheet is set to landscape in the setting window of FIG. 21, and FIG. 23D shows an example of imposition when the orientation of the output paper sheet is set to portrait and 2-time page repeat printing is selected.

Each of document pages A, B, and C are imposed on one paper sheet on the basis of the set imposition count (2-time page repeat printing or 4-time page repeat printing) and the orientation (portrait or landscape) of the output paper sheet under the control of the bookbinding application 104.

Figure 24:
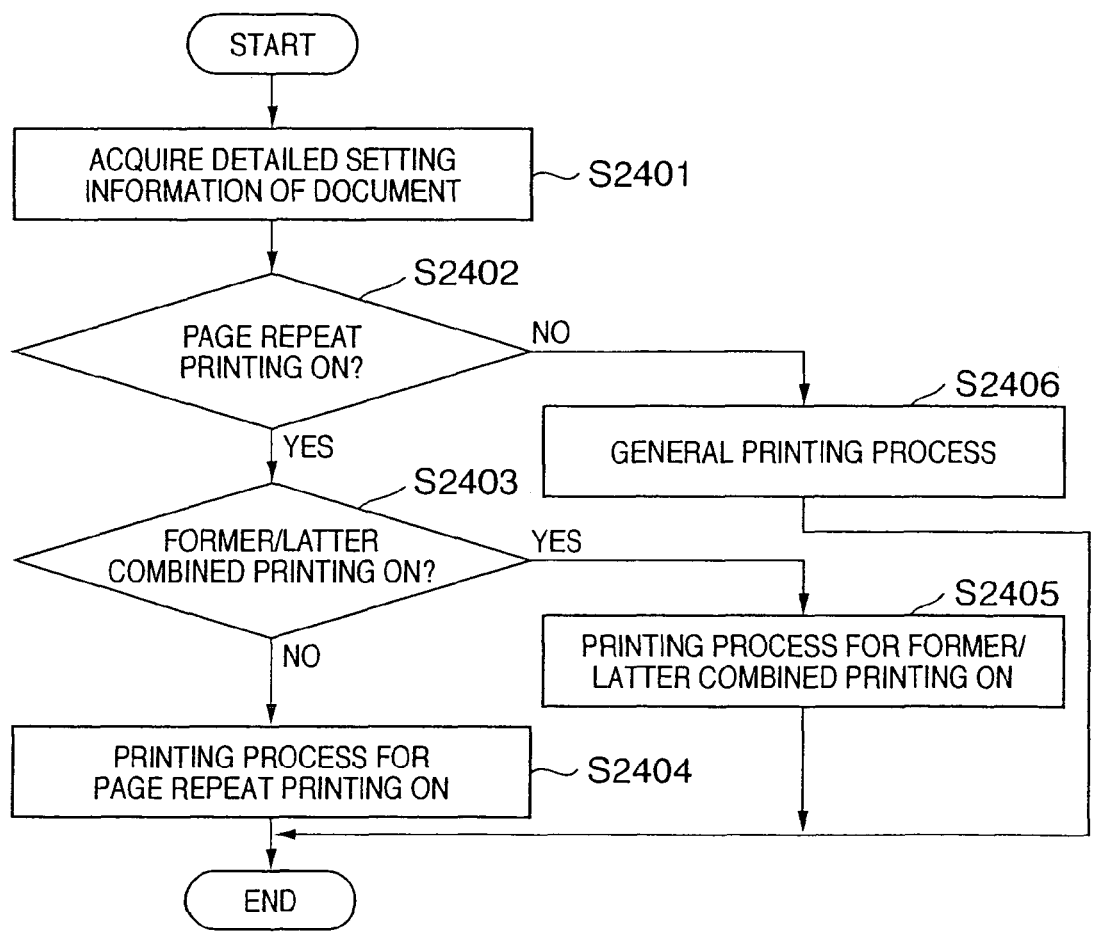
FIG. 24 is a flowchart for explaining a printing process in the document processing system according to the embodiment of the present invention.

The flow of a process of executing printing by the bookbinding application 104 for a document for which page repeat printing is set via the user interfaces (UIs) of FIGS. 20A, 20B, and 21 (2001, 2002, and 2003 in FIGS. 20A and 2101 in FIG. 21) will be explained with reference to the flowchart of FIG. 24.

When the bookbinding application 104 executes printing, the document setting information 403 (containing page repeat printing setting information (see FIGS. 4A and 4B)) is acquired in step S2401. In step S2402, it is determined whether page repeat printing has been set for a document to be printed. If page repeat printing is determined to have been set (YES in S2402), the process advances to the next step S2403 to determine whether former/latter combined printing has been set ("former/latter combined printing" is one of page repeat printing functions, details thereof will be explained later, and a description thereof will be omitted here). If former/latter combined printing is determined in step S2403 not to have been set (NO in S2403), the process advances to step S2404 to perform a general page repeat printing process. If former/latter combined printing is determined in step S2403 to have been set (YES in S2403), the process advances to step S2405 to perform the former/latter combined printing process serving as one type of page repeat printing. If page repeat printing has not been set in step S2402 (NO in step S2402), the process advances to step S2406 to perform a general printing process.

Figure 25:
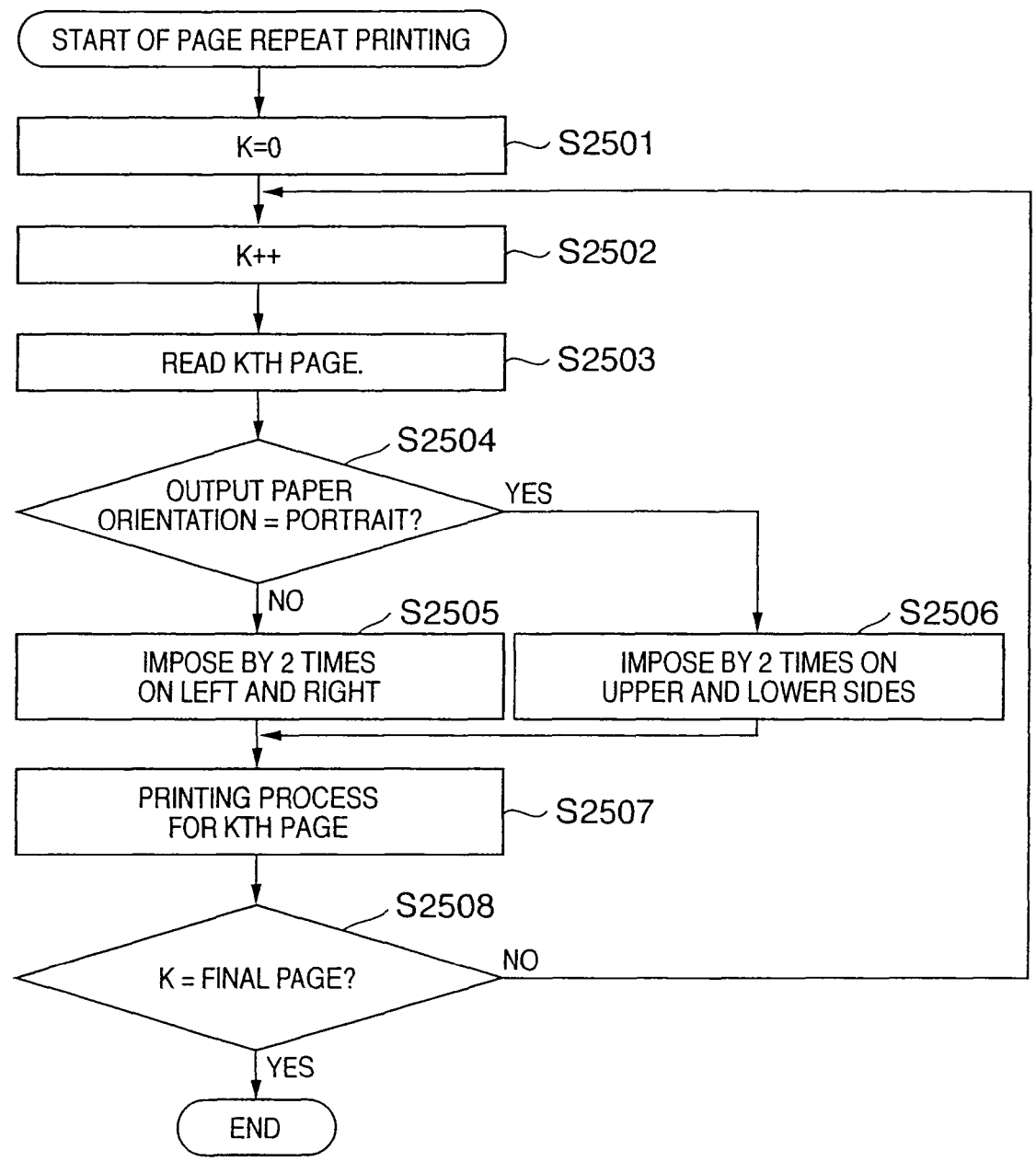
FIG. 25 is a flowchart for explaining a page repeat process in the document processing system according to the embodiment of the present invention.

Details of the page repeat printing process in step S2404 of FIG. 24 that is executed by the bookbinding application 104 will be explained with reference to the flowchart of FIG. 25. A case in which "2-time page repeat printing" is set as page repeat printing in the area 2001 of FIG. 20A will be exemplified.

In step S2501, the initial value of a physical page counter K is set in step S2501. The process advances to step S2502 to count up the physical page counter K by one (K++), and a document of the Kth page is read in step S2503. In step S2504, it is determined whether the orientation of the output paper sheet has been set to portrait. If the orientation of the output paper sheet has been set to portrait (YES in S2504), the process advances to step S2506, and the bookbinding application 104 imposes the document two times on the upper and lower halves of an output paper sheet.

If the orientation of the output paper sheet is determined in step S2504 to be landscape (NO in S2504), the process advances to step S2505, and the bookbinding application 104 imposes the document two times on the right and left halves of an output paper sheet.

If imposition ends in step S2505 or S2506, the process advances to step S2507, and the bookbinding application 104 performs the printing process for the Kth page. In step S2508, it is determined whether the Kth page is the final page of the document to be printed. If the Kth page is not the final page (NO in S2508), the process returns to step S2502 again and shifts to the printing process for the next page. The same process is repeated until all pages are processed.

In this manner, the printing process for 2-time page repeat printing is done. In this case, 2-time page repeat printing has been described. In 4-time page repeat printing, a document in step S2505 or S2506 of FIG. 25 is four times.

A former/latter combined printing process for a document having the inserting paper setting will be explained. "Former/latter combined printing" as one type of page repeat printing provided by the bookbinding application 104 will be described.

"Former/latter combined printing" is a printing method of laying out document data of different pages in a printable region on one paper sheet, arranging the document in different printing regions on one paper sheet, and printing the document on the premise of cutting after printing.

FIG. 26 is a table for explaining the imposition layout of each page in executing former/latter combined printing when the orientation of the output paper sheet is landscape in single-sided 2-time printing.

The printing regions of the output paper sheet are set to the left side (half) and right side (half), and the bookbinding application 104 imposes the first physical page corresponding to the first page of a document on the left side of the first paper sheet. The second physical page subsequent to the first physical page is imposed on the left side of the second paper sheet. When the total number of pages is N, the bookbinding application 104 imposes physical pages up to the (N/2)th physical page on the left side of paper sheets. An output paper sheet on which the (N/2)th When the total number of pages of a document (or chapter) is N, pages corresponding to the former half of the document are the first to (N/2)th pages. The bookbinding application 104 can acquire the total number of pages of a document (or chapter) by referring to, e.g., the document setting information 403 (or chapter setting information 407).

Pages corresponding to the latter half of the document are the (N/2+1)th to final pages. The bookbinding application 104 imposes the (N/2+1)th physical page on the right side of the first output paper sheet, and the ((N/2+1)+j)th physical page on the right side of the jth paper sheet. When N is an even number, the Nth physical page is imposed on the right side of the final paper sheet; when N is an odd number, the right side of the final paper sheet is blank.

Pages of the former half (part imposed on the left side of paper sheets) of the entire printed document and pages of the latter half (part imposed on the right side of paper sheets) of the entire printed document are superposed after cutting. A predetermined number of pages (total N pages) can be printed using the number (N/2) of output paper sheets which is half the total number (N) of pages.

The relationship between the right and left sides of a paper sheet for imposing pages is merely an example for descriptive convenience, and the gist of the present invention is not limited to the right & left relationship for imposition on a paper sheet.

For example, in imposition of pages in executing former/latter combined printing when the orientation of the output paper sheet is portrait in single-sided 2-time page repeat printing, physical pages corresponding to the upper and lower sides of a paper sheet are laid out under the control of the bookbinding application 104.

FIG. 27 is a table for explaining the imposition layout of each page in executing former/latter combined printing when the orientation of the output paper sheet is landscape in double-sided 2-time page repeat printing. Assume that the printing regions of the output paper sheet are set to the left side (half) and right side (half), similar to FIG. 26. The bookbinding application 104 imposes the first physical page corresponding to the first page of a document on the left side of the upper surface of the first paper sheet. The bookbinding application 104 imposes the second physical page subsequent to the first physical page on the left side of the lower surface of the first paper sheet. The bookbinding application 104 imposes successive physical pages on the upper and lower surfaces of paper sheets, and when the total number of pages is N, imposes pages up to the (N/2)th physical page on the left side of the upper and lower surfaces of paper sheets. An output paper sheet on which the (N/2)th physical page is imposed is the final paper sheet.

The bookbinding application 104 imposes the (N/2+1)th physical page on the right side of the upper surface of the first output paper sheet, and imposes physical pages on the upper and lower surfaces of paper sheets up to the final paper sheet. When N is an even number, the Nth physical page is imposed on the right side of the lower surface of the final paper sheet; when N is an odd number, the right side of the lower surface of the final paper sheet is blank.

Figure 28:
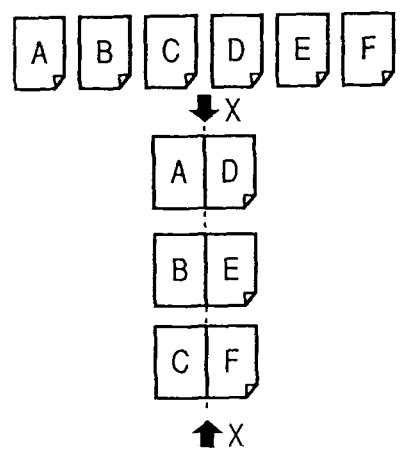
FIG. 28 is a view for explaining the former/latter combined printing process in the document processing system according to the embodiment of the present invention.

FIG. 28 is a view showing an output result when imposition is executed in executing former/latter combined printing by the bookbinding application 104 when the orientation of the output paper sheet is landscape in single-sided 2-time page repeat printing, as shown in FIG. 26.

Output paper sheets are cut at the center (portion X-X indicated by arrows) after printing, and the left half (printing result of the former half of a document) is superposed on the right half (latter half of the document). Successive pages A to F (6 pages) can be reproduced in the document order by half the number (three) of paper sheets.

Similarly, FIG. 29 is a view showing an output result when imposition is executed in executing former/latter combined printing by the bookbinding application 104 when the orientation of the output paper sheet is portrait in single-sided 2-time page repeat printing. Output paper sheets are cut at the center (portion Y-Y indicated by arrows) after printing, and the upper half (printing result of the former half of a document) is superposed on the lower half (latter half of the document). Successive pages A to F (6 pages) can be reproduced in the document order by half the number (three) of paper sheets.

[Former/Latter Combined Printing Considering Inserting Paper Setting]

Former/latter combined printing considering the inserting paper setting according to the embodiment will be described.

Figure 30:
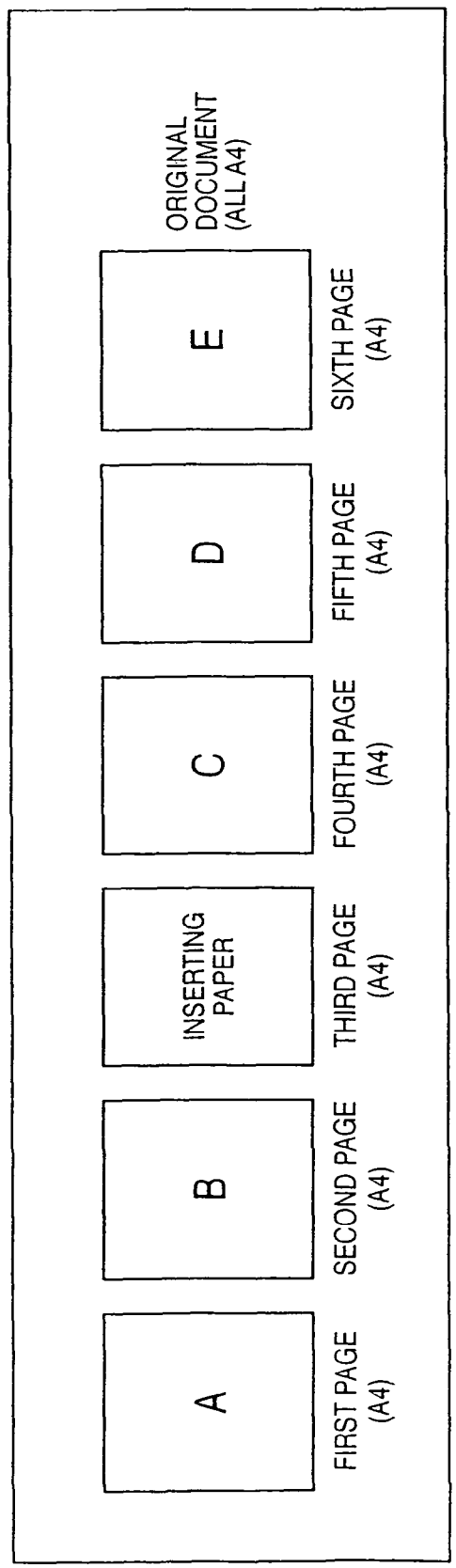
FIG. 30 is a view for explaining the former/latter combined printing process in the document processing system according to the embodiment of the present invention.
Figure 31:
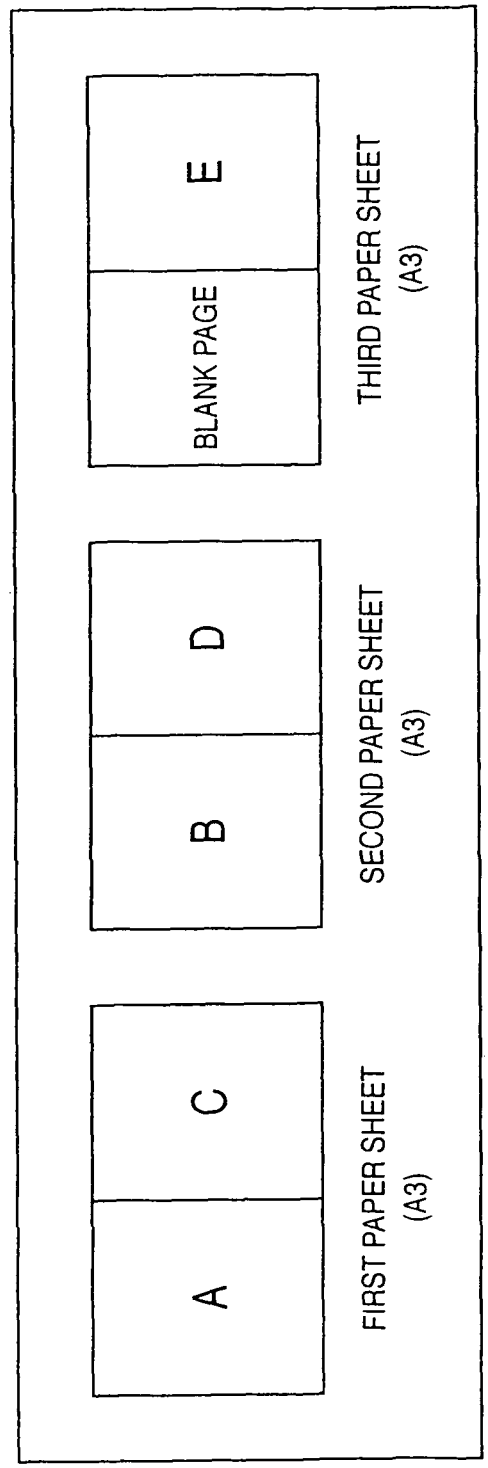
FIG. 31 is a view for explaining the former/latter combined printing process in the document processing system according to the embodiment of the present invention.

FIG. 30 is a view showing an electronic document corresponding to an original document which is applied to former/latter combined printing considering the inserting paper setting. The electronic document is formed from six A4-size pages, and an inserting paper sheet is set to be inserted at the third page. When this electronic document undergoes former/latter combined printing by applying the imposition layout shown in FIG. 26, an imposition result as shown in FIG. 31 is obtained. As shown in FIG. 31, the bookbinding application 104 does not feed a page corresponding to an inserting paper sheet inserted at the third page of the original document, but lays out a blank page so as to insert it on a half side (left half in FIG. 31) instead in the imposition layout (also called imposition control). Paper sheets printed with this imposition layout are cut, and a blank sheet corresponding to the inserting paper sheet appears at the third page.

The process flow of former/latter combined printing considering the inserting paper setting will be explained with reference to the flowcharts of FIGS. 32A and 32B. The bookbinding application 104 calculates the position of the imposition layout on a paper sheet on the basis of the imposition contents shown in FIGS. 26 and 27, and executes imposition control. In step S3201, the bookbinding application 104 sets initial values at a blank count E, chapter count K, logical page count R, physical page count Q, and paper count P.

The bookbinding application reads the (physical page count Q)th page in step S3202, and sets the number of a chapter containing the (physical page count Q)th page at the chapter count K in step S3203.

In step S3204, the bookbinding application 104 acquires detailed setting information of the (chapter count K)th chapter (see FIGS. 4A and 4B (Nos. 1 to 15): in this case, mainly inserting paper information), and determines whether the (physical page count Q)th page is an inserting paper page (S3205). If the bookbinding application 104 determines in step S3205 that the (physical page count Q)th page is not an inserting paper sheet (NO in S3205), the process advances to step S3206, and the bookbinding application 104 imposes the (physical page count Q)th page on the left half of the Pth paper sheet.

In step S3207, the bookbinding application 104 determines whether the (physical page count Q)th page is the final page. If the bookbinding application 104 determines that the (physical page count Q)th page is not the final page (NO in S3207), the process advances to step S3208 to count up the logical page count R (R++), and shifts to the imposition process on the right side of the Pth paper sheet.

If the bookbinding application 104 determines in step S3205 that the (physical page count Q)th page is an inserting paper sheet (YES in S3205), the process advances to step S3219, and the bookbinding application 104 cancels (OFF) the inserting paper setting. In step S3220, the bookbinding application 104 inserts a blank on the left half of the (paper count P)th paper sheet (controls not to impose any page). The process advances to step S3221, and the bookbinding application 104 determines whether the (physical page count Q)th page is the final page. If the (physical page count Q)th page is not the final page (NO in S3221), the process advances to step S3222 to count up the blank count E and logical page count R (E++, R++), and shifts to the imposition process on the right side of the (paper count P)th paper sheet (S3209).

The bookbinding application 104 reads data of the (physical page count (N/2+Q))th page in step S3209, and sets the number of a chapter containing the (physical page count (N/2+Q))th page at the chapter count K in step S3210. In step S3211, the bookbinding application 104 acquires detailed setting information of the (chapter count K)th chapter (see FIGS. 4A and 4B (Nos. 1 to 15): in this case, mainly inserting paper information). In step S3212, the bookbinding application 104 determines whether the (physical page count (N/2+Q))th page is an inserting paper sheet.

If the bookbinding application 104 determines in the process of step S3212 that the (physical page count (N/2+Q))th page is not an inserting paper sheet (NO in S3212), the process advances to step S3213, and the bookbinding application 104 imposes the (physical page count (N/2+Q))th page on the right half of the Pth paper sheet. In step S3214, the bookbinding application 104 determines whether the (physical page count (N/2+Q))th page is the final page.

If the bookbinding application 104 determines in step S3214 that the (physical page count (N/2+Q))th page is not the final page (NO in S3214), the process advances to step S3215. To impose the physical page on the next logical page, the bookbinding application 104 adds "2" to the physical page count Q, and counts up the logical page count R (R++). The bookbinding application 104 executes the printing process for the (paper count P)th paper sheet having undergone the imposition process in the left and right printing regions (S3216).

If the bookbinding application 104 determines in step S3212 that the (physical page count (N/2+Q))th page is an inserting paper sheet (YES in S3212), the process advances to step S3223, and the bookbinding application 104 cancels (OFF) the inserting paper setting, similar to step S3219. In step S3224, the bookbinding application 104 inserts a blank on the right half of the (paper count P)th paper sheet (controls not to impose any page).

In step S3225, the bookbinding application 104 counts up the blank page counter E and logical page counter R (E++, R++), and the process advances to step S3226.

In step S3226, the bookbinding application 104 determines whether the blank page count value E is E=2, and if E=2 (YES in S3226), the right and left sides of a paper sheet are blank, and the bookbinding application 104 switches the (paper count P)th paper sheet to the inserting paper setting (S3227), and sets to insert an inserting paper sheet in step S3228. At this time, the bookbinding application 104 sets insertion of an inserting paper sheet, and when double-sided printing is designated, can switch printing of an inserting paper sheet to single-sided printing. This implements imposition considering cutting after printing even in a document having the inserting paper setting, and can prevent futile charging by controlling the layout of a blank page.

In step S3229, the bookbinding application 104 determines whether the (physical page count (N/2+Q))th page is the final page. If the (physical page count (N/2+Q))th page is not the final page, the bookbinding application 104 adds one to the paper counter in step S3218 (P++), and the process returns to step S3202 again and shifts to the read process for the next page.

The bookbinding application 104 continues the same process until the physical page reaches the final page. If the bookbinding application 104 determines that the physical page is the final page in each step (S3207, S3221, S3214, or S3229), the bookbinding application 104 executes the printing process for the (paper count P)th paper sheet.

If the bookbinding application 104 determines in step S3217 that the (physical page count (N/2+Q))th page is the final page (YES in S3217), the bookbinding application 104 ends imposition control.

With the above-described imposition control by the bookbinding application 104, even if a document to be printed contains the inserting paper setting, proper imposition considering cutting after printing can be implemented by canceling the inserting paper setting and inserting a blank page instead of an inserting paper sheet.

When the bookbinding application 104 determines that the right and left sides of an output paper sheet are blank, the bookbinding application 104 sets insertion of an inserting paper sheet, and when double-sided printing is designated, switches printing of an inserting paper sheet to single-sided printing. Accordingly, the printing time can be shortened, and futile charging on printing of each paper sheet can be prevented.

[Former/Latter Combined Printing Method when Orientations of Cut Positions after Printing are Aligned]

Former/latter combined printing considering the cut position of a paper sheet after printing will be explained.

FIG. 33A is a view illustrating a "Finishing" sheet 3300 of the "Detailed Setting for Document" window of the bookbinding application 104. When former/latter combined printing which is one of page repeat printing functions is applied as the printing method, the user can select former/latter combined printing from a pull-down menu 3301, similar to the pull-down menu 2001 of FIG. 20A.

In FIG. 33A, "align cut edges of a document" designation is newly added to the check box of an area 3303. The setting state of FIG. 33A is different from that of FIG. 20A in that the cut edge is designated as "right of a document" (3302).

Figure 33B:
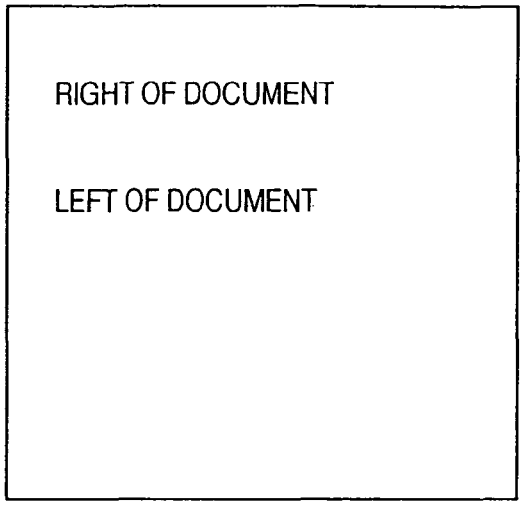
Figure 33C:
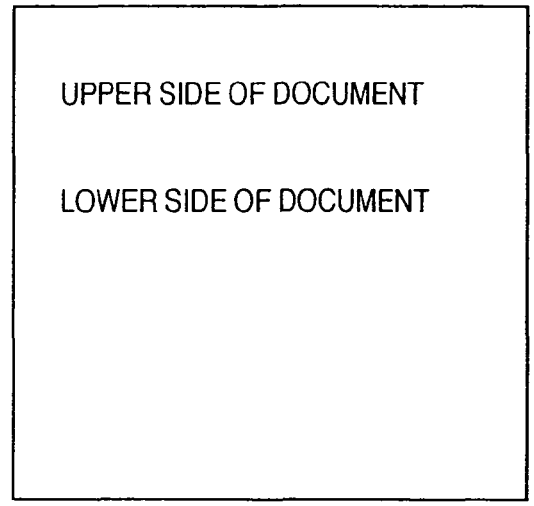

For example, when "landscape" is selected as the output paper orientation setting in FIG. 21, either "right of a document" or "left of a document" can be selected as the cut edge setting from a pull-down menu display (FIG. 33B). Similarly, when "portrait" is selected as the output paper orientation setting in FIG. 21, either "upper side of a document" or "lower side of a document" can be selected from a pull-down menu display (FIG. 33C).

For example, when "align cut edges of a document" (3303) and the cut edge alignment orientation setting (3302) are input, the attribute information generation unit 212 generates or updates attribute information for aligning cut edges as attribute information of a document in accordance with the input, and reflects the attribute information in the document setting information 403 (FIG. 3 and No. 15 in FIG. 4B). This facilitates condition settings on alignment of cut edges in cutting and imposition of each page, and can increase output variations selectable as the print form when the user operates the apparatus.

The bookbinding application 104 controls imposition of each page on a selected output paper sheet in accordance with the attribute information. The concrete contents of imposition control will be explained in detail with reference to FIGS. 37, 38A, 38B, 39A, and 39B.

Figure 32A:
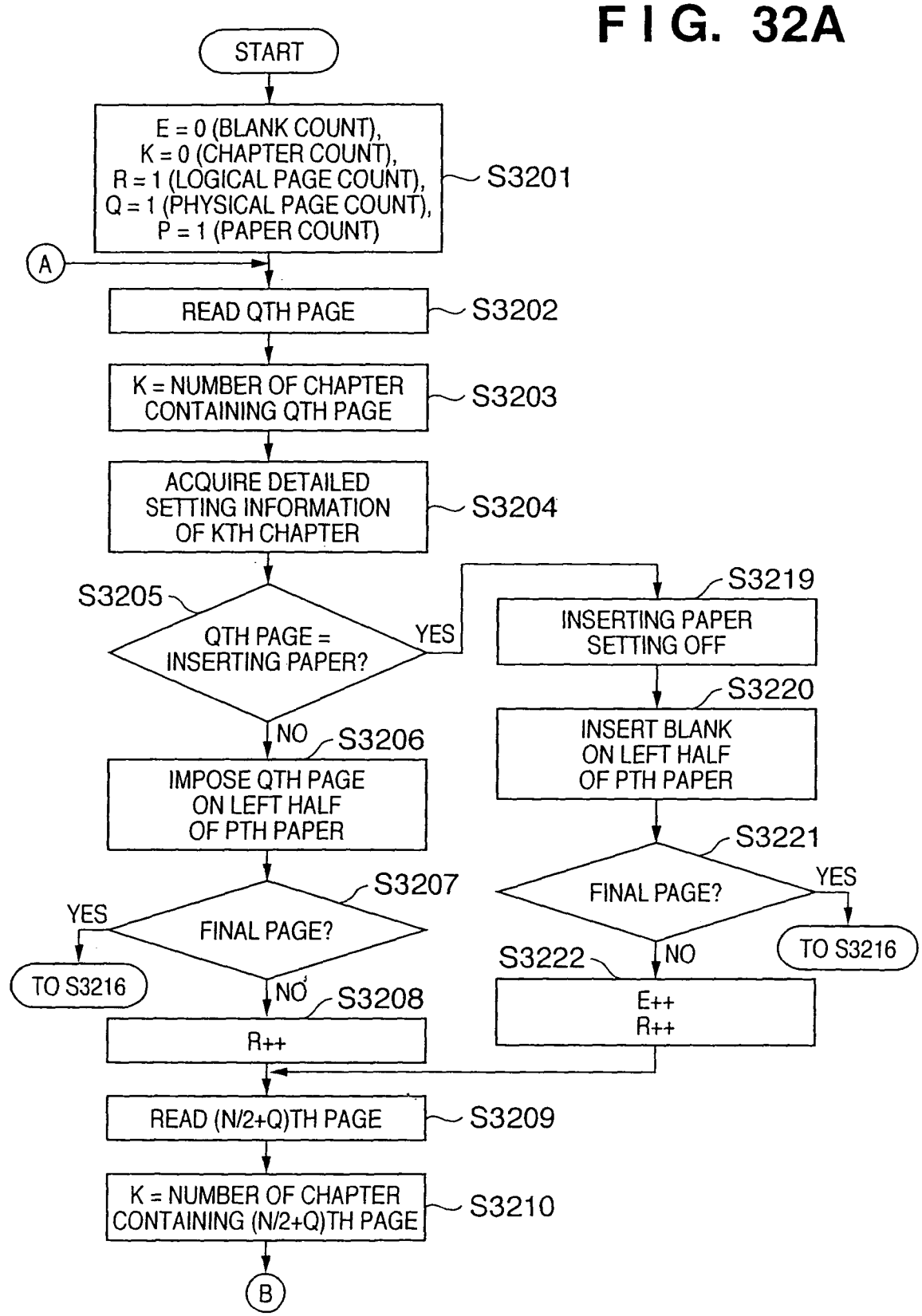
FIGS. 32A and 32B are flowcharts for explaining the former/latter combined printing process in the document processing system according to the embodiment of the present invention.
Figure 32B:
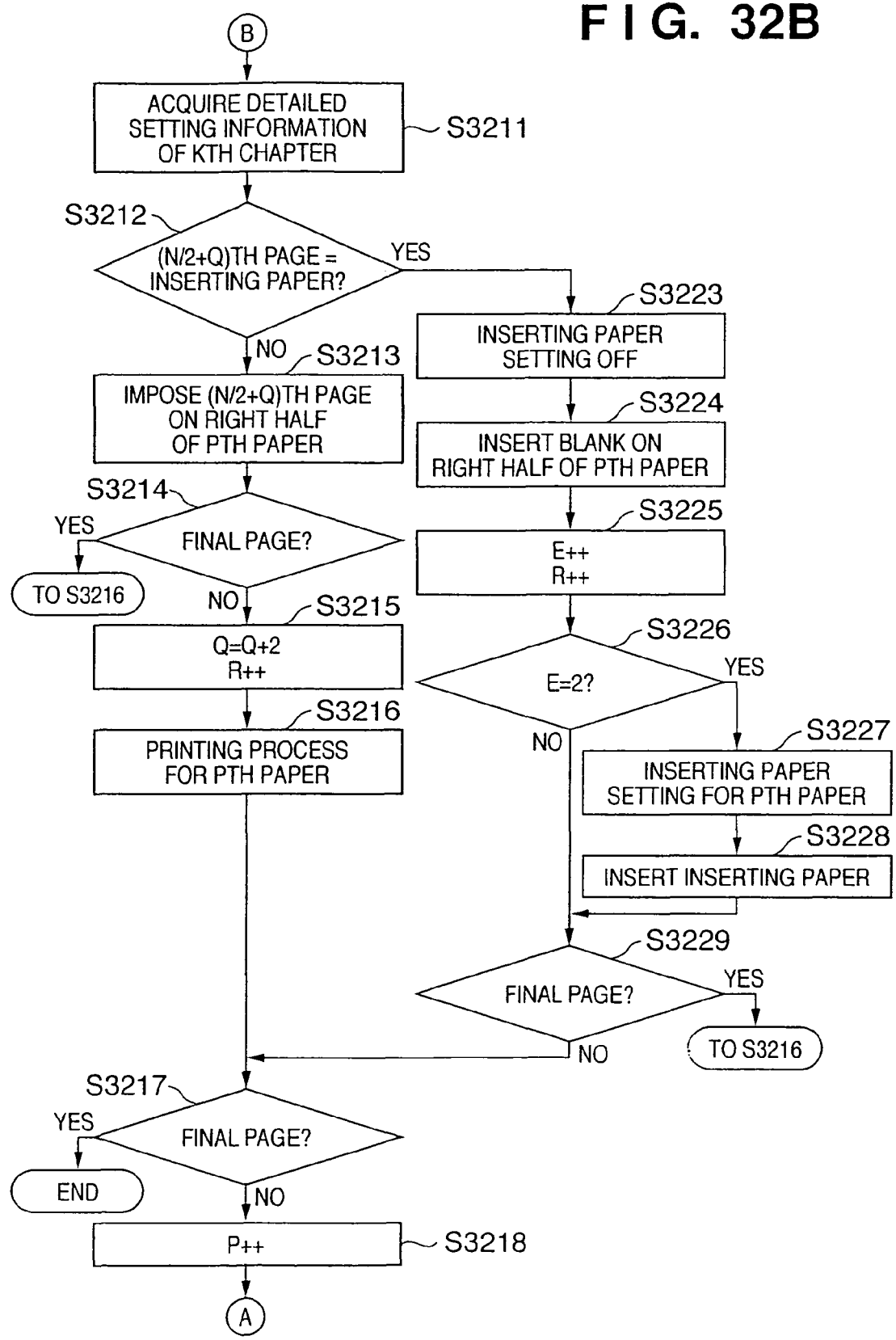
Figure 34:
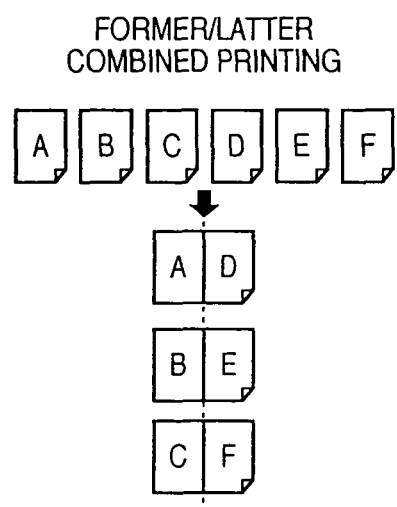
FIG. 34 is a view for explaining the former/latter combined printing process in the document processing system according to the embodiment of the present invention.

FIG. 34 is a view showing an example of executing former/latter combined printing in accordance with the flows of FIGS. 32A and 32B. For a document of six pages A to F with the "landscape" output paper orientation, the bookbinding application 104 imposes the former half (from pages A to C) of the document on the left side of output paper sheets, and the latter half (from pages D to F) of the document on the right side of output paper sheets. When the orientations of pages imposed on one output paper sheet are the same, cut positions are reversed laterally such that document pages (document pages of the former half) imposed on the left side of paper sheets have cut edges on the right side after cutting the paper sheets, but document pages (document pages of the latter half) imposed on the right side of paper sheets have cut edges on the left side after cutting. If pages are superposed after cutting, some pages have cut edges on the opening side, and some pages have cut edges on the bookbinding side. In this case, the bookbinding application 104 can perform imposition control for aligning cut positions to the left, right, upper side, or lower side. FIGS. 35A, 35B, 36A, and 36B are views for schematically explaining former/latter combined printing of aligning cut edges.

Figure 35A:
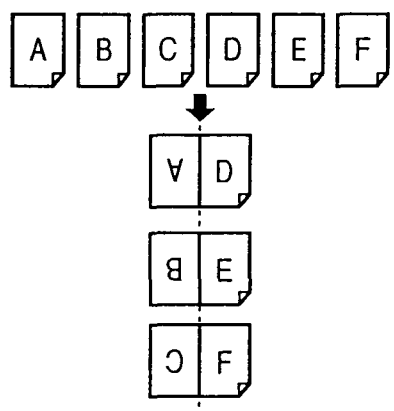
FIGS. 35A and 35B are views for explaining the former/latter combined printing process in the document processing system according to the present invention.
Figure 35B:
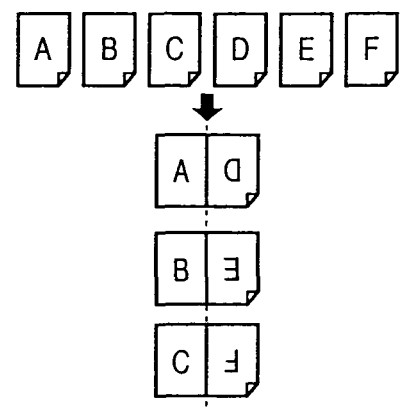

FIG. 35A shows a printing result when the paper orientation is landscape and the cut position is set to the left. Former/latter combined printing is executed by the bookbinding application 104 when the cut edge "left of a document" (output paper orientation is set to landscape) is selected in the area 3302 of FIG. 33A in former/latter combined printing. FIG. 35B shows a printing result when the cut edge "right of a document" (paper orientation is set to "landscape") is selected in the area 3302 of FIG. 33A in former/latter combined printing.

In FIG. 35A, the bookbinding application 104 performs imposition control by rotating by 180° pages (former half) to be imposed on the left half of paper sheets so as to reverse the head/tail orientation with respect to pages on the right side (latter half) of the paper sheets in order to align cut edges to the left side of the paper sheets. In FIG. 35B, the bookbinding application 104 performs imposition control by rotating by 180° pages (latter half) to be imposed on the right half of paper sheets so as to reverse the head/tail orientation with respect to pages on the left side (former half) of the paper sheets in order to align cut edges to the right side of the paper sheets.

Figure 36A:
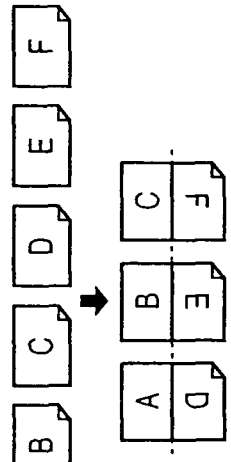
FIGS. 36A and 36B are views for explaining the former/latter combined printing process in the document processing system according to the present invention.
Figure 36B:
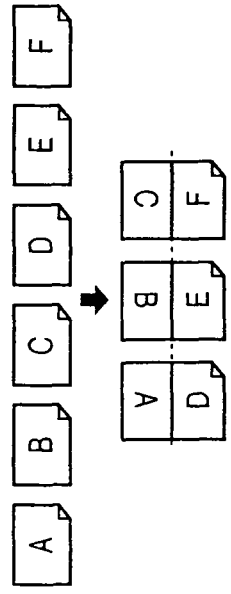

FIG. 36A shows a printing result when the paper orientation is portrait and the cut position is set to the upper side. Former/latter combined printing is executed by the bookbinding application 104 when the cut edge "upper side of a document" (output paper orientation is set to "portrait") is selected in the area 3302 of FIG. 33A in former/latter combined printing. FIG. 36B shows a printing result when the cut edge "lower side of a document" (paper orientation is set to portrait) is selected in the area 3302 of FIG. 33A in former/latter combined printing.

In FIG. 36A, the bookbinding application 104 performs imposition control by rotating by 180° pages (former half) to be imposed on the upper half of paper sheets so as to reverse the head/tail orientation with respect to pages (latter half) to be imposed on the lower half of the paper sheets in order to align cut edges to the upper side of the paper sheets. In FIG. 36B, the bookbinding application 104 performs imposition control by rotating by 180° pages (latter half) to be imposed on the lower half of paper sheets so as to reverse the head/tail orientation with respect to pages (former half) to be imposed on the upper half of the paper sheets in order to align cut edges to the lower side of the paper sheets.

Figure 37:
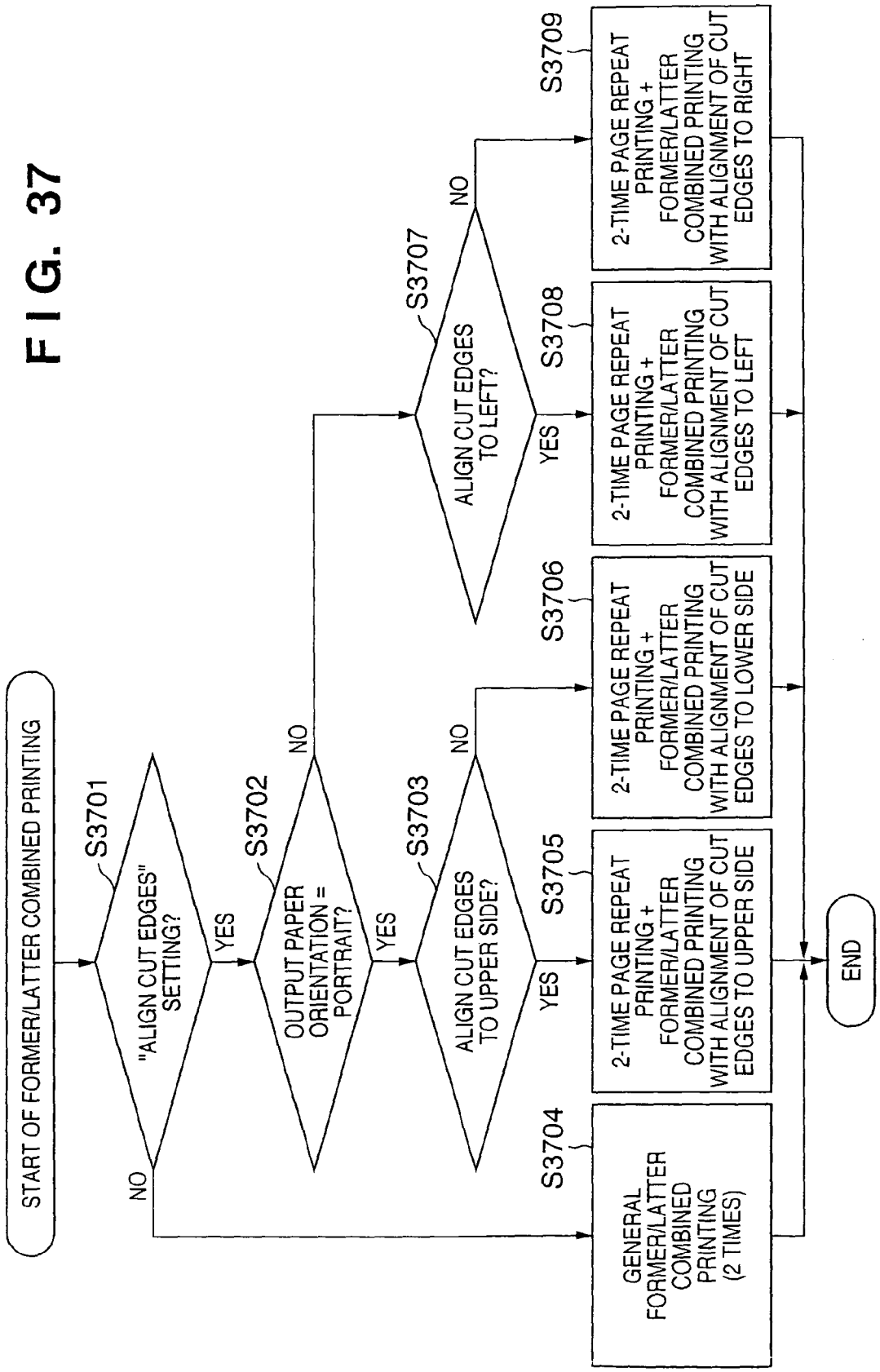
FIG. 37 is a flowchart for explaining the former/latter combined printing process in the document processing system according to the present invention.

The process flow of former/latter combined printing of rotating and imposing pages in consideration of the cut edge orientation of paper sheets will be explained with reference to the flowchart of FIG. 37. This flow explains in detail the process in step S2405 of FIG. 24.

In step S3701, the bookbinding application 104 determines whether alignment of cut edges has been set in the area 3303 of the "Detailed Setting for Document" window (FIG. 33A). If the bookbinding application 104 determines that alignment of cut edges has been set (YES in S3701), the process advances to step S3702, and the bookbinding application 104 determines whether the paper orientation (2102 in FIG. 21) is set to "portrait". If the paper orientation is set to "portrait" (YES in S3702), the process advances to step S3703, and the bookbinding application 104 determines whether the cut edge alignment orientation after cutting has been set to "upper side of a document" or "lower side of a document".

If the bookbinding application 104 determines in step S3703 that the alignment orientation has been set to "upper side of a document" (YES in S3703), the process advances to step S3705, and the bookbinding application 104 executes former/latter combined printing of aligning cut edges to the upper side of paper sheets in 2-time page repeat printing.

If the bookbinding application 104 determines in step S3703 that the alignment orientation has been set to "lower side of a document" (NO in S3703), the process advances to step S3706, and the bookbinding application 104 executes former/latter combined printing of aligning cut edges to the lower side of paper sheets in 2-time page repeat printing.

If the bookbinding application 104 determines in step S3702 that the output paper orientation is "landscape" (NO in S3702), the process advances to step S3707, and the bookbinding application 104 determines whether the cut edge alignment orientation after cutting has been set to "left of a document" or "right of a document".

If the bookbinding application 104 determines in step S3707 that the alignment orientation has been set to "left of a document" (YES in S3707), the process advances to step S3708, and the bookbinding application 104 executes former/latter combined printing of aligning cut edges to the left side of paper sheets in 2-time page repeat printing.

If the bookbinding application 104 determines in step S3707 that the alignment orientation has been set to "right of a document" (NO in S3707), the process advances to step S3709, and the bookbinding application 104 executes former/latter combined printing of aligning cut edges to the right side of paper sheets in 2-time page repeat printing.

If alignment of cut edges is not designated for a document in step S3701 ("align cut edges" check box 3303 in FIG. 33A is not checked), the process advances to step S3704, and the bookbinding application 104 performs general former/latter combined printing, as described with reference to the flowcharts of FIGS. 32A and 32B.

Next, the flow of a concrete process for a former/latter combined printing upon setting "align cut edges of a document" will be explained with reference to FIGS. 38A, 38B, 39A, and 39B. These contents correspond to step S3705 (former/latter combined printing when cut edges are aligned to the upper side of paper sheets in 2-time page repeat printing) and step S3709 (former/latter combined printing when cut edges are aligned to the right side of paper sheets in 2-time page repeat printing) in FIG. 37. These contents also basically apply to the processes in steps S3706 and S3709 of FIG. 37 except that the cut edge alignment orientation and the output paper orientation are different. In the processes of FIGS. 38A, 38B, 39A, and 39B, the bookbinding application 104 executes imposition control.

[Former/Latter Combined Printing when Alignment of Cut Edges is Set to Upper Side in 2-Time Page Repeat Printing]

Figure 38A:
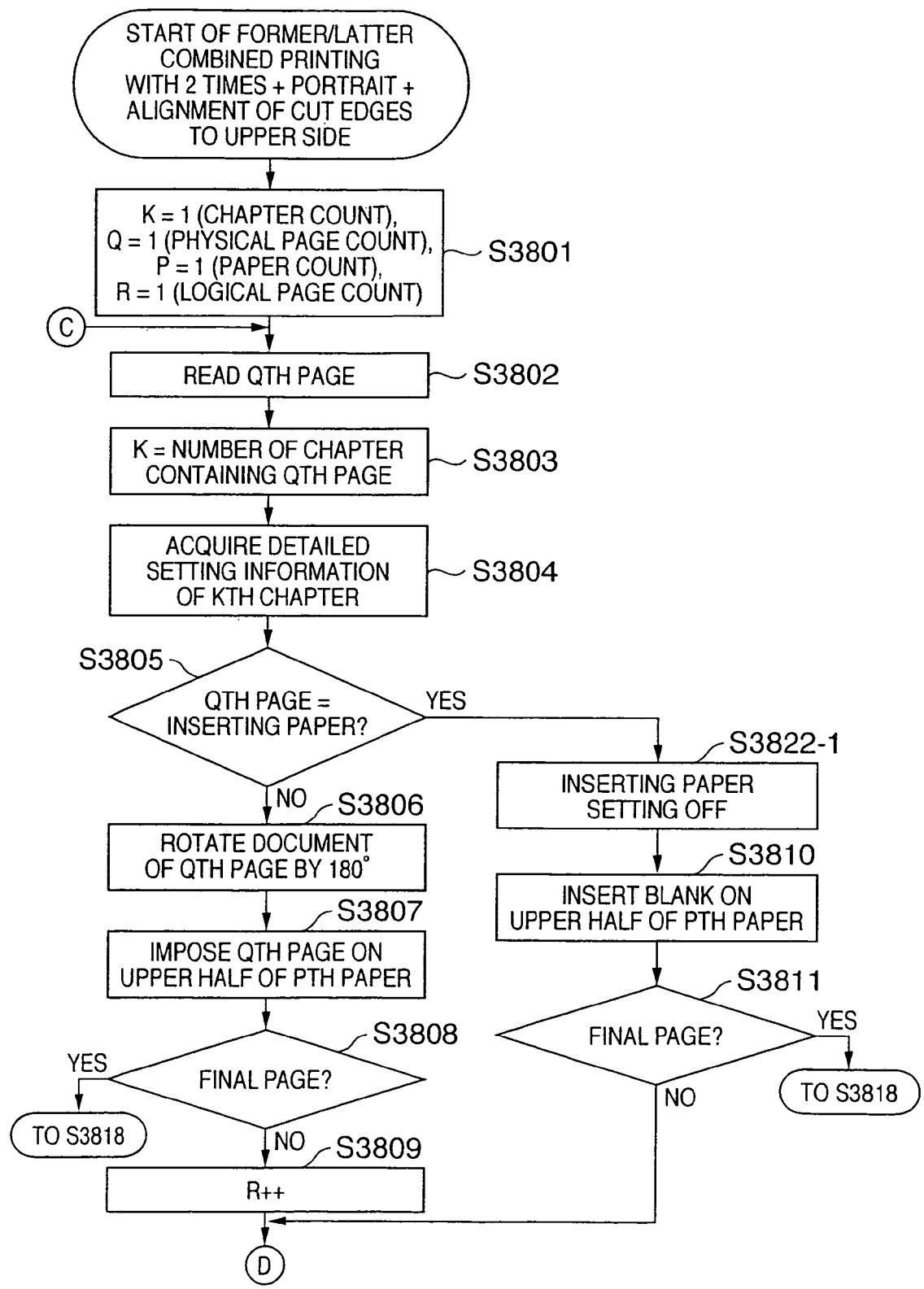
FIGS. 38A and 38B are flowcharts for explaining the former/latter combined printing process in the document processing system according to the present invention.
Figure 38B:
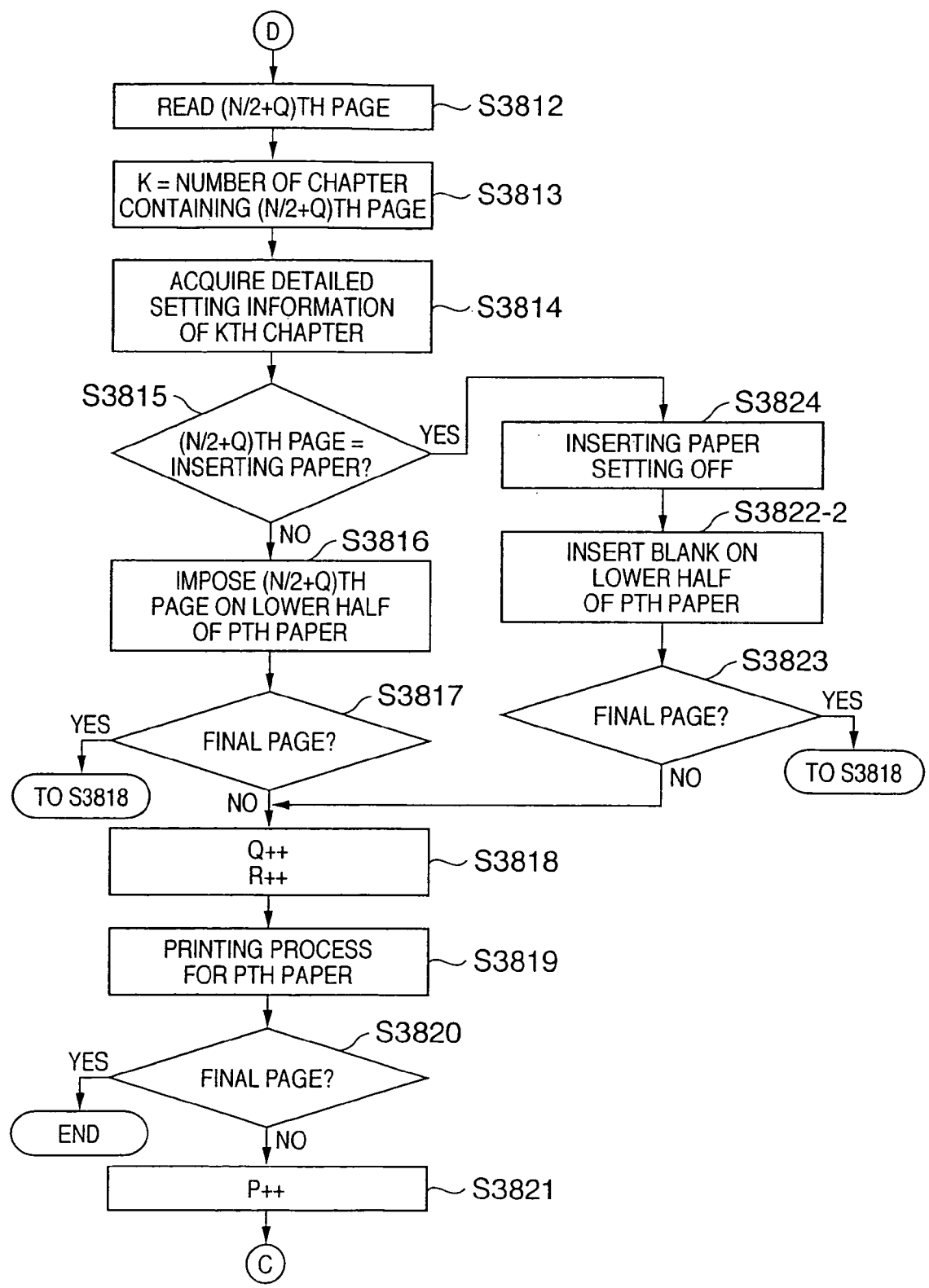

The process flow of former/latter combined printing when alignment of cut edges is set to the upper side of paper sheets in 2-time page repeat printing will be explained with reference to the flowcharts of FIGS. 38A and 38B. In step S3801 of FIG. 38A, the bookbinding application 104 sets initial values at the chapter count K, physical page count Q, paper count P, and logical page count R.

The bookbinding application 104 reads the (physical page count Q)th page in step S3802, and sets the number of a chapter containing the (physical page count Q)th page at the chapter count K in step S3803.

In step S3804, the bookbinding application 104 acquires detailed setting information of the (chapter count K)th chapter (see FIGS. 4A and 4B (Nos. 1 to 15): in this case, mainly inserting paper information), and determines whether the (physical page count Q)th page is an inserting paper page (S3805). If the bookbinding application 104 determines in step S3805 that the (physical page count Q)th page is not an inserting paper sheet (NO in S3805), the process advances to step S3806, and the bookbinding application 104 imposes the (physical page count Q)th page on the upper half of the Pth paper sheet. At this time, the bookbinding application 104 rotates a document of the (physical page count Q)th page by 180° (reverses the head/tail orientation), and imposes the page (S3807).

In step S3808, the bookbinding application 104 determines whether the (physical page count Q)th page is the final page. If the bookbinding application 104 determines that the (physical page count Q)th page is not the final page (NO in S3808), the process advances to step S3809 to count up the logical page count R (R++), and shifts to the imposition process on the lower side of the Pth paper sheet.

If the bookbinding application 104 determines in step S3805 that the (physical page count Q)th page is an inserting paper sheet (YES in S3805), the bookbinding application 104 cancels (OFF) the inserting paper setting in step S3822-1, advances the process to step S3810, and inserts a blank on the upper half of the (paper count P)th paper sheet (controls not to impose any page). The process advances to step S3811, and the bookbinding application 104 determines whether the (physical page count Q)th page is the final page. If the (physical page count Q)th page is not the final page (NO in S3811), the process advances to step S3812 and shifts to the imposition process on the lower side of the (paper count P)th paper sheet (S3812).

The bookbinding application 104 reads data of the (physical page count (N/2+Q))th page in step S3812, and sets the number of a chapter containing the (physical page count (N/2+Q))th page at the chapter count K in step S3813. In step S3814, the bookbinding application 104 acquires detailed setting information of the (chapter count K)th chapter (see FIGS. 4A and 4B (Nos. 1 to 15): in this case, mainly inserting paper information). In step S3815, the bookbinding application 104 determines whether the (physical page count (N/2+Q))th page is an inserting paper sheet.

If the bookbinding application 104 determines in step S3815 that the (physical page count (N/2+Q))th page is not an inserting paper sheet (NO in S3815), the process advances to step S3816, and the bookbinding application 104 imposes the (physical page count (N/2+Q))th page on the lower half of the Pth paper sheet. In step S3816, the bookbinding application 104 determines whether the (physical page count (N/2+Q))th page is the final page.

If the bookbinding application 104 determines in step S3816 that the (physical page count (N/2+Q))th page is not the final page (NO in S3816), the process advances to step S3817. To impose the physical page on the next logical page, the bookbinding application 104 counts up the physical page count Q and logical page count R (Q++, R++). The bookbinding application 104 executes the printing process for the (paper count P)th paper sheet having undergone the imposition process in the upper and lower printing regions (S3818).

If the bookbinding application 104 determines in step S3815 that the (physical page count (N/2+Q))th page is an inserting paper sheet (YES in S3815), the bookbinding application 104 cancels (OFF) the inserting paper setting in step S3824, advances the process to step S3822-2, and inserts a blank on the lower half of the (paper count P)th paper sheet (controls not to impose any page), similar to step S3810.

In step S3822-2, the bookbinding application 104 determines whether the (physical page count (N/2+Q))th page is the final page. If the (physical page count (N/2+Q))th page is not the final page, the bookbinding application 104 counts up the physical page count and logical page count R (Q++, R++)

in step S3818, and executes the printing process for the (paper count P)th paper sheet. If the bookbinding application 104 determines in step S3820 that the (physical page count (N/2+Q))th page is the final page (YES in S3820), the bookbinding application 104 ends the imposition process. If the bookbinding application 104 determines in step S3820 that the (physical page count (N/2+Q))th page is not the final page (NO in S3820), the process advances to step S3821 to count up the paper count P (P++). The process returns to step S3802 again and shifts to the read process for the next page.

The bookbinding application 104 continues the same process until the physical page reaches the final page if the bookbinding application 104 determines that the physical page is the final page in each step (S3807, S3811, S3816, or S3822), the bookbinding application 104 executes the printing process for the (paper count P)th paper sheet.

[Former/Latter Combined Printing when Alignment of Cut Edges is Set to Right Side in 2-Time Page Repeat Printing]

Figure 39A:
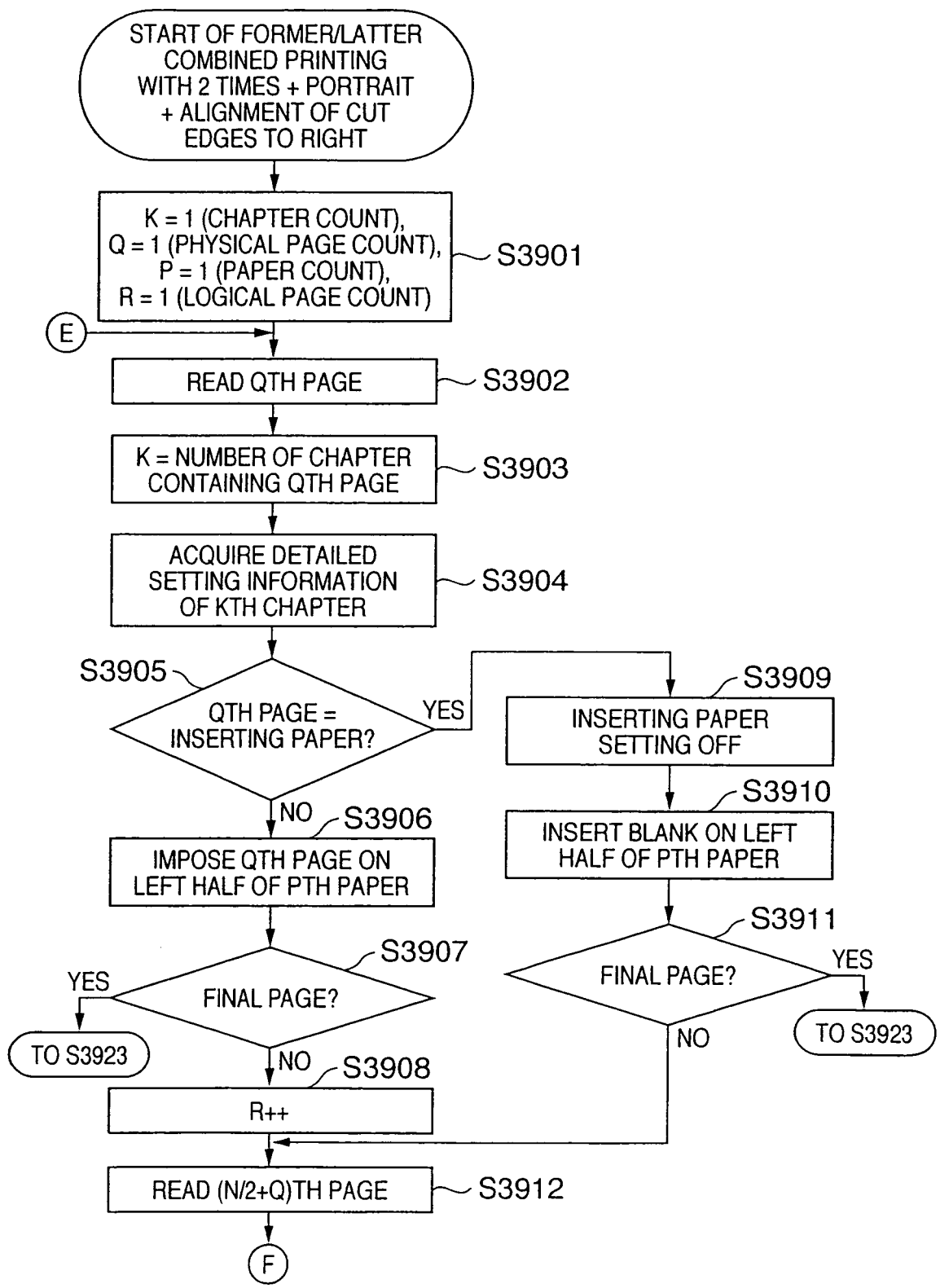
FIGS. 39A and 39B are flowcharts for explaining the former/latter combined printing process in the document processing system according to the present invention.
Figure 39B:
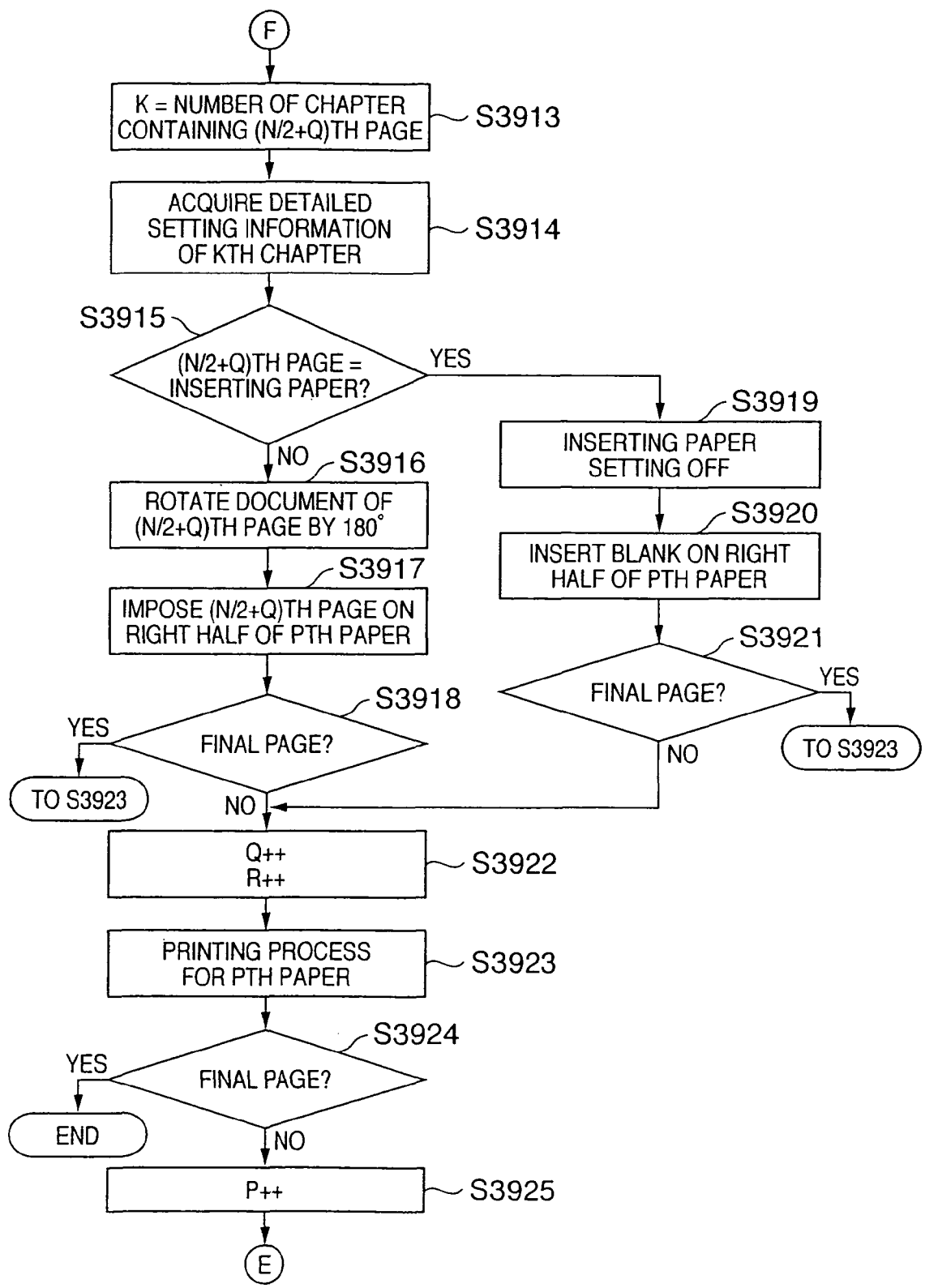

The process flow of former/latter combined printing when alignment of cut edges is set to the right side in 2-time page repeat printing will be explained with reference to the flowcharts of FIGS. 39A and 39B. In step S3901, the bookbinding application 104 sets initial values at the chapter count K, physical page count Q, paper count P, and logical page count R.

The bookbinding application 104 reads the (physical page count Q)th page in step S3902, and sets the number of a chapter containing the (physical page count Q)th page at the chapter count K in step S3903.

In step S3904, the bookbinding application 104 acquires detailed setting information of the (chapter count K)th chapter (see FIGS. 4A and 4B (Nos. 1 to 15): in this case, mainly inserting paper information), and determines whether the (physical page count Q)th page is an inserting paper page (S3905). If the bookbinding application 104 determines in step S3905 that the (physical page count Q)th page is not an inserting paper sheet (NO in S3905), the process advances to step S3906, and the bookbinding application 104 imposes the (physical page count Q)th page on the left half of the Pth paper sheet.

In step S3907, the bookbinding application 104 determines whether the (physical page count Q)th page is the final page. If the bookbinding application 104 determines that the (physical page count Q)th page is not the final page (NO in S3907), the process advances to step S3908 to count up the logical page count R (R++), and shifts to the imposition process on the right side of the Pth paper sheet.

If the bookbinding application 104 determines in step S3905 that the (physical page count Q)th page is an inserting paper sheet (YES in S3905), the bookbinding application 104 cancels (OFF) the inserting paper setting (S3909), advances the process to step S3910, and inserts a blank on the left half of the (paper count P)th paper sheet (controls not to impose any page). The process advances to step S3911, and the bookbinding application 104 determines whether the (physical page count Q)th page is the final page. If the (physical page count Q)th page is not the final page (NO in S3911), the process advances to step S3912 and shifts to the imposition process on the right side of the (paper count P)th paper sheet (S3912).

The bookbinding application 104 reads data of the (physical page count (N/2+Q))th page in step S3912, and sets the number of a chapter containing the (physical page count (N/2+Q))th page at the chapter count K in step S3913. In step S3914, the bookbinding application 104 acquires detailed setting information of the (chapter count K)th chapter (see FIGS. 4A and 4B (Nos. 1 to 15): in this case, mainly inserting paper information). In step S3915, the bookbinding application 104 determines whether the (physical page count (N/2+Q))th page is an inserting paper sheet.

If the bookbinding application 104 determines in step S3915 that the (physical page count (N/2+Q))th page is not an inserting paper sheet (NO in S3915), the process advances to step S3916, and the bookbinding application 104 imposes the (physical page count (N/2+Q))th page on the right half of the Pth paper sheet. At this time, the bookbinding application 104 rotates a document of the (physical page count (N/2+Q))th page by 180° (reverses the head/tail orientation), and imposes the page (S3917).

In step S3918, the bookbinding application 104 determines whether the (physical page count (N/2+Q))th page is the final page. If the bookbinding application 104 determines in step S3918 that the (physical page count (N/2+Q))th page is not the final page (NO in S3918), the process advances to step S3922. To impose the physical page on the next logical page, the bookbinding application 104 counts up the physical page count Q and logical page count R (Q++, R++). The bookbinding application 104 executes the printing process for the (paper count P)th paper sheet having undergone the imposition process in the left and right printing regions (S3923).

If the bookbinding application 104 determines in step S3915 that the (physical page count (N/2+Q))th page is an inserting paper sheet (YES in S3915), the process advances to step S3919, and the bookbinding application 104 cancels (OFF) the inserting paper setting (S3919) and inserts a blank on the right half of the (paper count P)th paper sheet (controls not to impose any page), similar to step S3910.

In step S3921, the bookbinding application 104 determines whether the (physical page count (N/2+Q))th page is the final page. If the (physical page count (N/2+Q))th page is not the final page, the bookbinding application 104 counts up the physical page count and logical page count R (Q++, R++) in step S3922, and executes the printing process for the (paper count P)th paper sheet. If the bookbinding application 104 determines in step S3924 that the (physical page count (N/2+Q))th page is the final page (YES in S3924), the bookbinding application 104 ends the imposition process. If the bookbinding application 104 determines in step S3924 that the (physical page count (N/2+Q))th page is not the final page (NO in S3924), the process advances to step S3925 to count up the paper count P (P++). The process returns to step S3902 again and shifts to the read process for the next page.

The bookbinding application 104 continues the same process until the physical page reaches the final page. If the bookbinding application 104 determines that the physical page is the final page in each step (S3907, S3911, S3918, or S3921), the bookbinding application 104 executes the printing process for the (paper count P)th paper sheet.

As has been described above, the present invention facilitates condition settings associated with the print form, and can increase output variations selectable as the print form when the user operates the apparatus in 2-time page repeat printing, 4-time page repeat printing, and former/latter combined printing.

Also, the present invention can perform imposition considering cutting after printing for a document having the inserting paper setting, and can prevent futile charging by controlling the layout of blank pages.

The present invention may be applied to a system including a plurality of devices (e.g., a host computer, interface device, reader, and printer) or an apparatus (e.g., a copying machine, printer, or facsimile apparatus) formed by a single device. The object of the present invention is also achieved when a storage medium which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, and ROM.

The functions of the above-described embodiment are realized when the computer executes the readout program codes. Also, the functions of the above-described embodiment are realized when an OS (Operating System) or the like running on the computer performs some or all of actual processes on the basis of the instructions of the program codes. Furthermore, the present invention includes a case in which, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiment.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-121872 filed on Apr. 16, 2004, which is hereby incorporated by reference herein.

What is claimed is:

1. A document processing apparatus which sets a printing attribute for a document including a plurality of pages, comprising:
   a first setting unit constructed to set a former/latter printing layout attribute indicating to divide data having a plurality of pages into data corresponding to former pages and data corresponding to latter pages and lay out a former page of the data corresponding to the former pages and a latter page of the data corresponding to the latter pages, on one surface of a sheet;
   a second setting unit constructed to set, in a case where the sheet is cut into the former page and the latter page after the sheet is printed, an aligning attribute indicating to align a cutting edge of the former page and the latter page;
   a third setting unit constructed to set a first cutting edge or a second cutting edge of an opposite side to the first cutting edge as a cutting edge to be cut in a case where the aligning attribute is set by said second setting unit; and
   a generation unit constructed to generate print data so that a first page being the former page is laid out in a first direction and a second page being the latter page is laid out in a second direction which is rotated by 180 degrees to the first direction, and the first page and the second page are laid out on the one surface of the sheet in a case where the former/latter printing layout attribute is set by said first setting unit and the first cutting edge is set as the cutting edge to be cut by said third setting unit,
   wherein the generation unit generates the print data so that the first page is laid out in the second direction on the surface of the sheet, and the second page is laid out in the first direction on the surface, in a case where the cutting edge to be cut is changed from the first cutting edge to the second cutting edge.

2. The apparatus according to claim 1, wherein said first setting unit sets the former/latter printing layout attribute in accordance with an instruction received via a setting window provided by an application, and
   wherein said third setting unit sets the cutting edge to be cut in accordance with an instruction received via the setting window provided by the application.

3. The apparatus according to claim 1, wherein a combination of the first cutting edge and the second cutting edge includes:
   a combination of a right side edge and a left side edge; and
   a combination of an upper side edge and a lower side edge.

4. A document processing method executed in a document processing apparatus which sets a printing attribute for a document including a plurality of pages, said method comprising:
   a first setting step of setting a former/latter printing layout attribute indicating to divide data having a plurality of pages into data corresponding to former pages and data corresponding to latter pages and lay out a former page of the data corresponding to the former pages and a latter page of the data corresponding to the latter pages, on one surface of a sheet;
   a second setting step of setting, in a case where the sheet is cut into the former page and the latter page after the sheet is printed, an aligning attribute indicating to align a cutting edge of the former page and the latter page;
   a third setting step of setting a first cutting edge or a second cutting edge of an opposite side to the first cutting edge as a cutting edge to be cut in a case where the aligning attribute is set by said second setting unit; and
   a generation step of generating print data so that a first page being the former page is laid out in a first direction and a second page being the latter page is laid out in a second direction which is rotated by 180 degrees to the first direction, and the first page and the second page are laid out on the one surface of the sheet in a case where the former/latter printing layout attribute is set by said first setting unit and the first cutting edge is set as the cutting edge to be cut by said third setting unit,
   wherein in the generating step, the print data is generated so that the first page is laid out in the second direction on the surface of the sheet, and the second page is laid out in the first direction on the surface, in a case where the cutting edge to be cut is changed from the first cutting edge to the second cutting edge.

5. The method according to claim 4, wherein the first setting step sets the former/latter printing layout attribute in accordance with an instruction received via a setting window provided by an application, and
   the third setting step sets the cutting edge to be cut in accordance with an instruction received via the setting window provided by the application.

6. The method according to claim 4, wherein a combination of the first cutting edge and the second cutting edge includes:
   a combination of a right side edge and a left side edge; and
   a combination of an upper side edge and a lower side edge.

7. A non-transitory computer readable storage medium retrievably storing a computer-executable program which causes a computer to execute a document processing method executed in a document processing apparatus which sets a printing attribute for a document including a plurality of pages, said method comprising:

- a first setting step of setting a former/latter printing layout attribute indicating to divide data having a plurality of pages into data corresponding to former pages and data corresponding to latter pages and lay out a former page of the data of the former pages and a latter page of the data of the latter pages, on one surface of a sheet;
- a second setting step of setting, in a case where the sheet is cut into the former page and the latter page after the sheet is printed, an aligning attribute indicating to align a cutting edge of the former page and the latter page;
- a third setting step of setting a first cutting edge or a second cutting edge of an opposite side to the first cutting edge as a cutting edge to be cut in a case where the aligning attribute is set by said second setting unit; and
- a generation step of generating print data so that a first page being the former page is laid out in a first direction and a second page being the latter page is laid out in a second direction which is rotated by 180 degrees to the first direction, and the first page and the second page are laid out on the one surface of the sheet in a case where the former/latter printing layout attribute is set by said first setting unit and the first cutting edge is set as the cutting edge to be cut by said third setting unit, wherein in the generation step, the print data is generated so that the first page is laid out in the second direction on the surface of the sheet, and the second page is laid out in the first direction on the surface, in a case where the cutting edge to be cut is changed from the first cutting edge to the second cutting edge.

8. The non-transitory computer readable storage medium according to claim 7, wherein the first setting step sets the former/latter printing layout attribute in accordance with an instruction received via a setting window provided by an application, and the third setting step sets the cutting edge to be cut in accordance with an instruction received via the setting window provided by the application.

9. The non-transitory computer readable storage medium according to claim 7, wherein a combination of the first cutting edge and the second cutting edge includes:

a combination of a right side edge and a left side edge; and
a combination of an upper side edge and a lower side edge.

* * * * *